US012079399B2

(12) United States Patent
Jung et al.

(10) Patent No.: US 12,079,399 B2
(45) Date of Patent: Sep. 3, 2024

(54) ELECTRONIC DEVICE, AND METHOD FOR DISPLAYING ELECTRONIC PEN POINTER THEREOF

(71) Applicant: Samsung Electronics Co., Ltd., Suwon-si (KR)

(72) Inventors: Inhyung Jung, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/161,465

(22) Filed: Jan. 30, 2023

(65) Prior Publication Data
US 2023/0176665 A1   Jun. 8, 2023

Related U.S. Application Data

(63) Continuation of application No. PCT/KR2021/010286, filed on Aug. 4, 2021.

(30) Foreign Application Priority Data

Aug. 4, 2020   (KR) .................. 10-2020-0097269

(51) Int. Cl.
*G06F 3/0354* (2013.01)
*G06F 3/038* (2013.01)
*G06F 3/041* (2006.01)

(52) U.S. Cl.
CPC ........ *G06F 3/03545* (2013.01); *G06F 3/0383* (2013.01); *G06F 3/04162* (2019.05)

(58) Field of Classification Search
CPC ....... G06F 3/03545; G06F 2203/04807; G06F 3/0488; G06F 3/04883; G06F 3/041–047; G06F 2203/041–04114
See application file for complete search history.

(56) References Cited

U.S. PATENT DOCUMENTS

2008/0225007 A1 * 9/2008 Nakadaira ........... G06F 3/03545
345/173
2009/0251410 A1 * 10/2009 Mori .................... G06F 3/0488
345/157

(Continued)

FOREIGN PATENT DOCUMENTS

JP         5136675 B2    2/2013
JP      2013/242821 A   12/2013

(Continued)

*Primary Examiner* — Sanjiv D. Patel
(74) *Attorney, Agent, or Firm* — Jefferson IP Law, LLP

(57) ABSTRACT

An electronic device is provided. The electronic device includes a display and a processor, wherein the processor senses an input of an electronic pen and responds to the input of the electronic pen to display an electronic pen pointer on the display, confirms first information related to visual characteristics of the electronic pen pointer, confirms second information related to electronic pen situation information and/or display situation information, compares the first information to the second information to determine the direction and coordinates for changing the position of the electronic pen pointer, and can perform control so that the displaying of the electronic pen pointer is changed to the determined direction and coordinates.

11 Claims, 14 Drawing Sheets

(56) References Cited

U.S. PATENT DOCUMENTS

| | | | |
|---|---|---|---|
| 2012/0032979 | A1 | 2/2012 | Blow et al. |
| 2012/0256831 | A1 | 10/2012 | Sakurai |
| 2013/0009907 | A1 | 1/2013 | Rosenberg et al. |
| 2014/0035872 | A1 | 2/2014 | Park et al. |
| 2014/0055427 | A1 | 2/2014 | Kim et al. |
| 2014/0059499 | A1 | 2/2014 | Kim et al. |
| 2015/0242002 | A1 | 8/2015 | Altman et al. |
| 2016/0364091 | A1 | 12/2016 | Bernstein et al. |
| 2018/0173398 | A1* | 6/2018 | Doi ............... G06F 3/04812 |
| 2019/0064947 | A1 | 2/2019 | Saito |
| 2019/0265828 | A1* | 8/2019 | Hauenstein ......... G06F 3/0488 |

FOREIGN PATENT DOCUMENTS

| | | |
|---|---|---|
| JP | 2019/045637 A | 3/2019 |
| KR | 10-2010-0045628 A | 5/2010 |
| KR | 10-1095851 B1 | 12/2011 |
| KR | 10-2013-0081780 A | 7/2013 |
| KR | 10-2014-0026711 A | 3/2014 |
| KR | 10-2014-0030379 A | 3/2014 |
| KR | 10-2014-0077000 A | 6/2014 |
| KR | 10-2019-0138498 A | 10/2021 |

* cited by examiner

ELECTRONIC DEVICE, AND METHOD FOR DISPLAYING ELECTRONIC PEN POINTER THEREOF

CROSS-REFERENCE TO RELATED APPLICATION(S)

This application is a continuation application, claiming priority under § 365(c), of an International application No. PCT/KR2021/010286, filed on Aug. 4, 2021, which is based on and claims the benefit of a Korean patent application number 10-2020-0097269, filed on Aug. 4, 2020, in the Korean Intellectual Property Office, the disclosure of which is incorporated by reference herein in its entirety.

BACKGROUND

1. Field

The disclosure relates to an electronic device and a method for displaying an electronic pen pointer.

2. Description of Related Art

Electronic devices may receive a user's input through the touch screen thereof, and provide an additional input means such as an electronic pen to allow a user to more precisely make a touch input or a hover input. An electronic pen may be mounted in the inner or outer space of an electronic device, or may be provided as a separate device.

A hover input may imply a non-contact input method of detecting the proximity of an input tool (e.g., an electronic pen or a finger) without direct touching of a screen (or a touch screen). An electronic device may display not only a visual effect for a touch input on the screen thereof, but also a visual effect for a hover input on the screen. For example, an electronic device may display a graphic object, such as a hover pointer, in response to a hover input of an electronic pen, thereby providing user convenience.

The above information is presented as background information only to assist with an understanding of the disclosure. No determination has been made, and no assertion is made, as to whether any of the above might be applicable as prior art with regard to the disclosure.

SUMMARY

Generally, a graphic object displayed on an electronic device is displayed using a visual element pre-generated by a graphic designer or is displayed in a designated method. For example, a hover pointer of an electronic pen is displayed using a circular object, such as a dot, based on hovering coordinates by default. Such a hover pointer of a circular object may have a minimized size, and is problematic in that, when a user brings an electronic pen close to an electronic device for hovering, the hover pointer may be hidden from the user's sight. Further, the electronic device has a limitation in that it should express a graphic object in a pre-configured or a pre-stored display method.

Aspects of the disclosure are to address at least the above-mentioned problems and/or disadvantages and to provide at least the advantages described below. Accordingly, an aspect of the disclosure is to provide an electronic device and a method for displaying an electronic pen pointer.

Additional aspects will be set forth in part in the description which follows and, in part, will be apparent from the description, or may be learned by practice of the presented embodiments.

In accordance with an aspect of the disclosure, an electronic device is provided. The electronic device includes a display and a processor, wherein the processor senses an input of an electronic pen. responds to the input of the electronic pen to display an electronic pen pointer on the display, identifies first information related to visual characteristics of the electronic pen pointer, identifies second information related to at least one of context information of the electronic pen or context information of the display, compares the first information to the second information to determine a direction and coordinates for changing the position of the electronic pen pointer, and can perform control so that the displaying of the electronic pen pointer is changed to the determined direction and coordinates.

In accordance with another aspect of the disclosure, a method is provided. The method includes receiving an input of an electronic pen, displaying an electronic pen pointer on a display in response to the input of the electronic pen, identifying first information related to a visual feature of the electronic pen pointer, identifying second information related to at least one of context information of the electronic pent and context information of the display, comparing the first information with the second information to determine a direction and coordinates for change of a position of the electronic pen pointer, and changing the displaying of the electronic pen pointer to the determined direction and coordinate.

Various embodiments provide a customized environment in which a graphic object theme related to an electronic pen is changeable according to a user's taste.

In various embodiments, a personalized electronic pen pointer generated by a customized environment may be automatically disposed in a user's sight or in a direction providing easy usability in consideration of at least one of an electronic pen context and a physical context of a display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
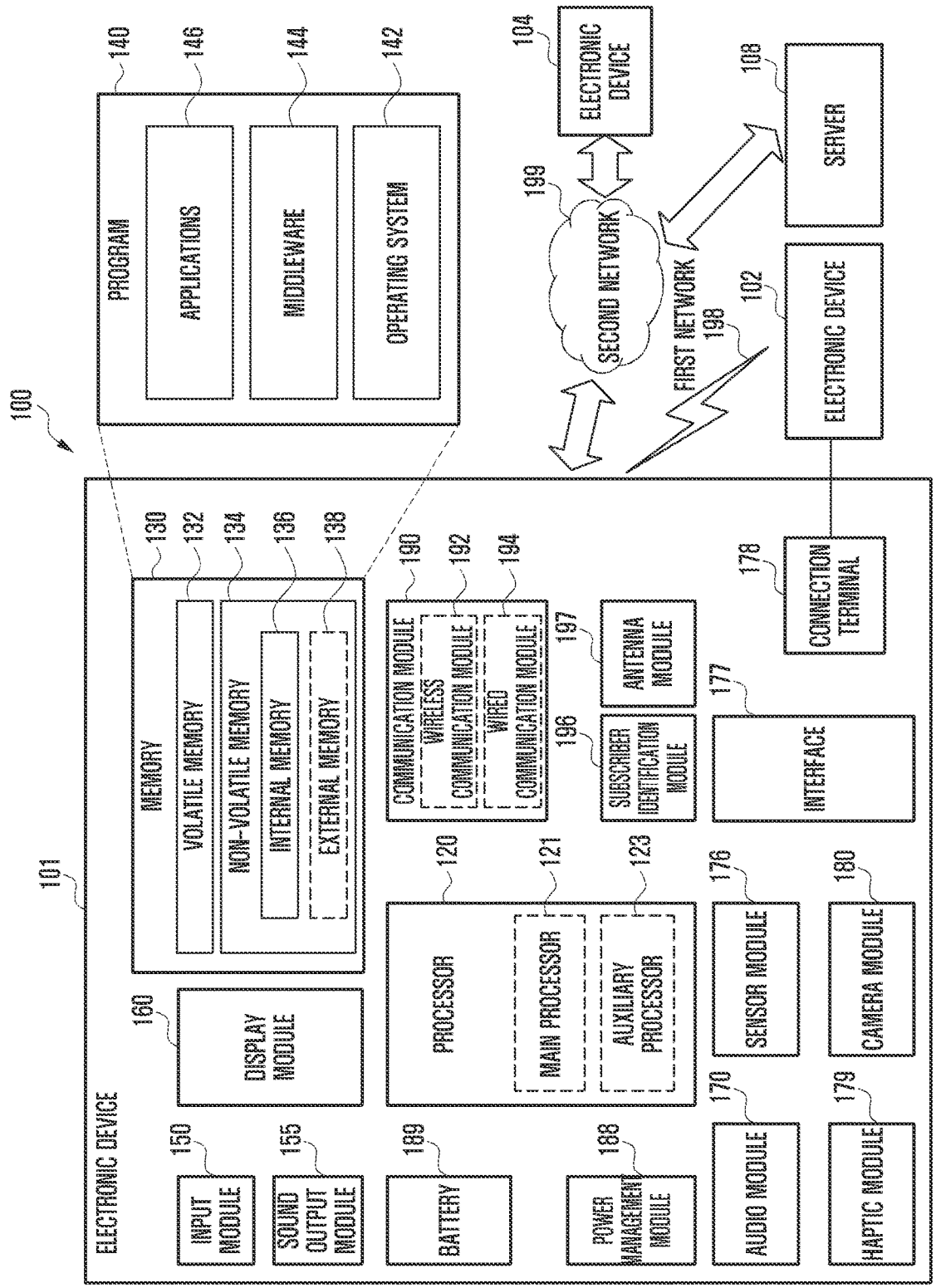
FIG. 1 is a block diagram illustrating an example electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
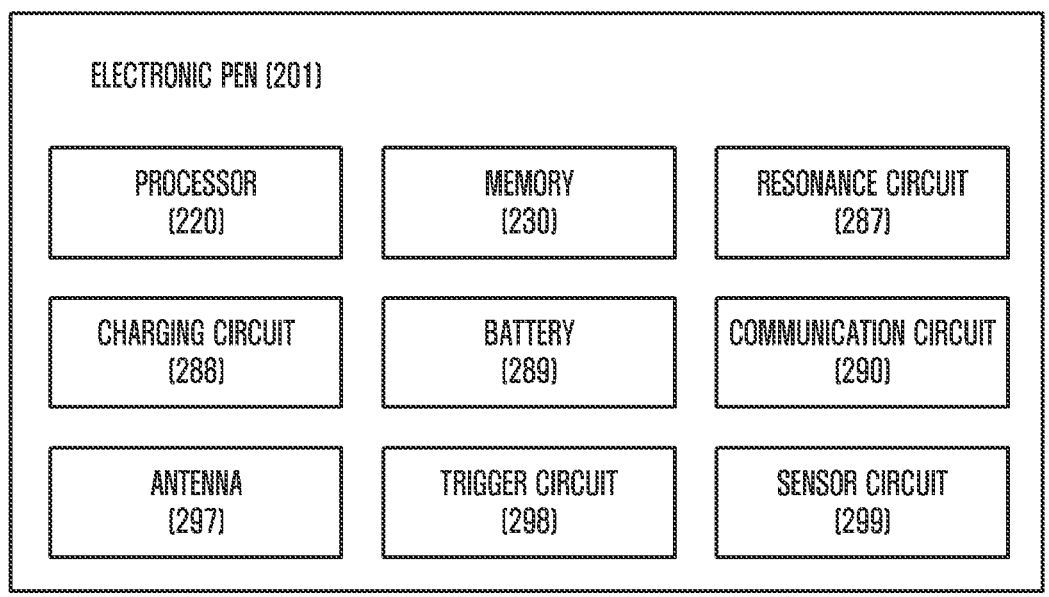
FIG. 2 is a block diagram illustrating an electronic pen according to an embodiment of the disclosure.

FIG. 2 is a block diagram illustrating an electronic pen according to an embodiment of the disclosure.

Referring to FIG. 2, an electronic pen 201 according to an embodiment may include a pen processor 220, a memory 230, a resonance circuit 287, a charging circuit 288, a battery 289, a communication circuit 290, an antenna 297, a trigger circuit 298, and/or a sensor 299. In some embodiments, the pen processor 220, at least a part of the resonance circuit 287, and/or at least a part of the communication circuit 290 may be configured on a printed circuit board or in a chip type. The processor 220, the resonance circuit 287, and/or the communication circuit 290 may be electrically connected to the memory 230, the charging circuit 288, the battery 289, the antenna 297, the trigger circuit 298, and/or the sensor 299. The electronic pen 201 according to an embodiment may be configured by only the resonance circuit 287 and a button.

The pen processor 220 may include a customized hardware module or a generic processor configured to execute software (e.g., an application program). The pen processor 220 may include a hardware element (function) or a software element (program) including at least one of various sensors included in the electronic pen 201, a data measurement module, an input/output interface, a module for managing a state or an environment of the electronic pen 201, or a communication module. The processor 220 may include, for example, one of hardware, software, or firmware, or a combination of two or more.

According to an embodiment, the pen processor 220 may be configured to transmit, to the electronic device 101 via the communication circuit 290, information showing a pushed state of a button, sensing information obtained by the sensor 299, and/or information (information associated with the position of the electronic pen 201) calculated based on sensing information.

The resonance circuit 287 may include a coil (or inductor) and/or a capacitor. The resonance circuit 287 may be resonated based on an electromagnetic field signal generated from a digitizer (e.g., the display module 160 in FIG. 1) of the electronic device 101, and may radiate an electromagnetic resonance (EMR) input signal (or magnetic field) due to the resonance. In case that the electronic pen 201 transmits a signal in the EMR method, the electronic pen 201 may generate a signal including a resonant frequency, based on an electromagnetic field generated from an inductive panel of the electronic device 101. In case that the electronic pen 201 transmits a signal in the AES method, the electronic pen 201 may generate a signal by using capacity coupling with the electronic device 101. In case that the electronic pen 201 transmits a signal in the ECR method, the electronic pen 201 may generate a signal including a resonant frequency, based on an electric field generated from a capacitive device of the electronic device 101.

The electronic device 101 may identify the position of the electronic pen 201 on the electronic device 101 by using an electro-magnetic resonance input signal. For example, the electronic device 101 may identify the position of the electronic pen 201, based on the magnitude of induced electromotive force (e.g., output current) generated by an electro-magnetic resonance input signal from each of multiple channels (e.g., multiple loop coils) in a digitizer. In the above description, the electronic device 101 and the electronic pen 201 have been described as operating based on the EMR method, but this merely corresponds to an example. The electronic device 101 may also generate a signal based on an electric field, based on the electrically coupled resonance (ECR) method. The resonance circuit of the electronic pen 201 may be resonated by an electric field. The electronic device 101 may identify potentials of multiple channels (e.g., electrodes) caused by resonance in the electronic pen 201, and may also identify the position of the electronic pen 201, based on potential. The electronic pen 201 may be implemented in the active electrostatic (AES) method, and a person who is skilled in the art would understand that there is no limit to the implementation type thereof.

According to an embodiment, the resonance circuit 287 may be used to change frequency or strength of an electromagnetic field according to a user's manipulation state. For example, the resonance circuit 287 may provide various frequencies for recognition of a hovering input, a drawing input, a button input, or an erasing input. For example, the resonance circuit 287 may provide various resonant frequencies according to a connection combination of multiple capacitors, or may provide various resonant frequencies, based on a variable inductor and/or a variable capacitor.

The memory 230 may store information related to an operation of the electronic pen 201. For example, the information may include information for communication with the electronic device 101 and frequency information related to an input operation of the electronic pen 201. In addition, the memory 230 may store a program (or an application, an algorithm, or a processing loop) for calculating information (e.g., coordinate information and/or displacement information) on the position of the electronic pen 201 from sensing data of the sensor 299. The memory 230 may also store a communication stack of the communication circuit 290. According to implementation, the communication circuit 290 and/or the processor 220 may include a dedicated memory.

The communication circuit 290 may be configured to perform a function of wireless communication between the electronic pen 201 and the communication module 190 of the electronic device 101. According to an embodiment, the communication circuit 290 may transmit state information of the electronic pen 201, input information, and/or information associated with position to the electronic device 101 by using a short-range communication method. For example, the communication circuit 290 may transmit, to the electronic device 101, direction information (e.g., motion sensor data) of the electronic pen 201, obtained via the sensor circuit 299, speech information input via a microphone, or remaining capacity information of the battery 289. For example, the communication circuit 290 may transmit, to the electronic device 101, sensing data obtained from the sensor circuit 299 and/or information associated with the position of the electronic pen 201, identified based on sensing data. For example, the communication circuit 290 may transmit, to the electronic device 101, information on a state of a button included in the electronic pen 201, obtained via the trigger circuit 298. For example, the short-range communication method may include at least one of Bluetooth, Bluetooth low energy (BLE) NFC, Wi-Fi direct, or wireless LAN, but there is no limit to the type thereof.

The antenna 297 may be used to transmit or receive a signal or power to or from the outside (e.g., the electronic device 101). According to an embodiment, the electronic pen 201 may include multiple antennas 297, and may select at least one antenna 297 suitable for a communication method thereamong. The communication circuit 290 may exchange a signal or power with an external electronic device via the selected at least one antenna 297.

The trigger circuit 298 may include at least one button. According to an embodiment, the trigger circuit 298 may use an input signal of a button to transmit a trigger signal to the electronic device 101.

According to an embodiment, the processor 220 may identify a type (e.g., an EMR button or a BLE button) or an input method (e.g., touch or push) of a button of the electronic pen 201, based on a received trigger signal.

The sensor circuit 299 may generate an electrical signal or a data value corresponding to an internal operation state or an external environment state of the electronic pen 201. For example, the sensor circuit 299 may include at least one of a motion sensor, a remaining battery capacity sensing sensor, a pressure sensor, an optical sensor, a temperature sensor, a geomagnetic sensor, or a biometric sensor.

The sensor circuit 299 may include an acceleration sensor (accelerometer), a gyro sensor, and/or a geomagnetic sensor. The acceleration sensor may sense information on a linear movement of the electronic pen 201. The gyro sensor may sense information related to rotation of the electronic pen 201. The geomagnetic sensor may sense information on an inclined state (e.g., posture (orientation)) of the electronic pen 201. The processor 220 may transmit information obtained from the sensor circuit 299 to the electronic device 101 via the communication circuit 290. Alternatively, the pen processor 220 may transmit information (e.g., the coordinates of the electronic pen 201 and/or the displacement of the electronic pen 201) associated with the position of the electronic pen 201 to the electronic device 101 via the communication circuit 290, based on information obtained from the sensor circuit 299.

Figure 3:
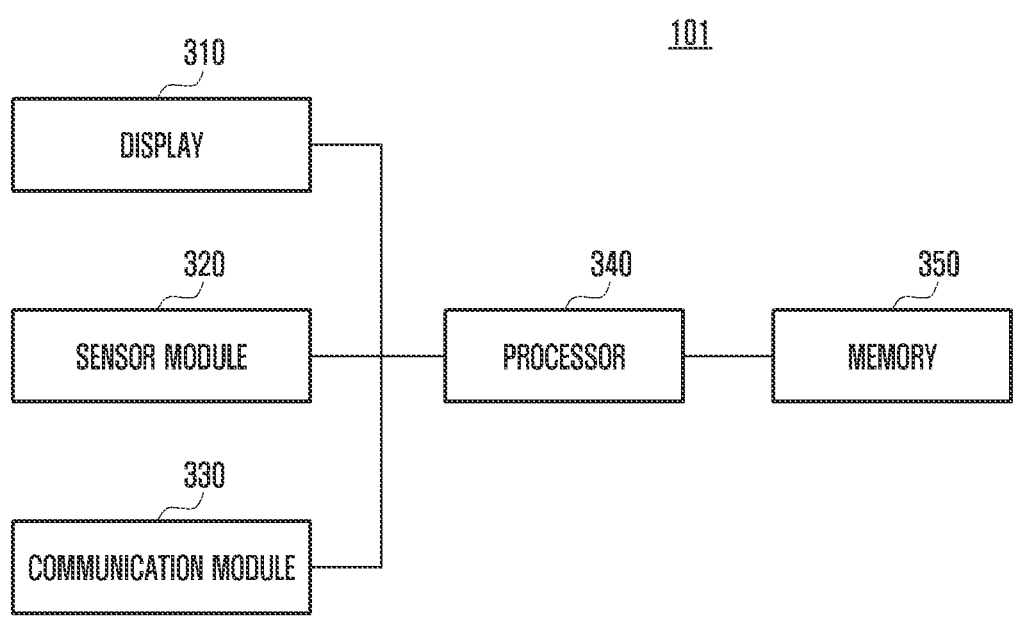
FIG. 3 is a block diagram of an electronic device according to an embodiment of the disclosure.

FIG. 3 is a block diagram of an electronic device according to an embodiment of the disclosure.

Referring to FIG. 3, the electronic device 101 according to an embodiment may include a display 310 (e.g., the display module 160 in FIG. 1), a sensor module 320 (e.g., the sensor module 176 in FIG. 1), a communication module 330 (e.g., the communication module 190 in FIG. 1), a processor 340 (e.g., the processor 120 in FIG. 1), and/or a memory 350 (e.g., the memory 130 in FIG. 1).

According to an embodiment, the electronic device 101 may allow an electronic pen (e.g., the electronic pen 201 in FIG. 1) to be received in or attached to an inner space or an external space of the electronic device 101, but is not limited thereto. According to some embodiments, the electronic pen 201 may be configured as a separate external input device.

The display 310 may include an input/output device performing an input function and a display function. The display 310 may include at least some of elements of the display module 160 in FIG. 1 and/or functions of the input module 150 in FIG. 1. The display 310 may refer to a flat-panel display or a flexible display. The display 310 may include at least one display. The display 310 may display a graphic user interface (GUI) element and/or visual information (e.g., text, graphic, image, video, or a combination thereof).

According to an embodiment, the display 310 may be coupled to or disposed to be adjacent to a touch sensing circuit, a pressure sensor capable of measuring the strength (pressure) of a touch, and/or a digitizer circuit that detects the electronic pen 201. The display 310 may be a touch-sensitive display. The touch-sensitive display may detect a touch, a touch gesture, an air gesture, or a hover (or proximity touch) input using a user's finger (or a different part of the body). The touch-sensitive display may detect a touch, an air command, or a hover input of the electronic pen 201.

According to an embodiment, the display 310 may execute a function corresponding to an input signal of the electronic pen 201, and display a user interface therefor. For example, the display 310 may provide a pen theme UI related to the electronic pen 201 to a user.

The sensor module 320 may include a sensor capable of detecting at least one of a display context, for example, a folded state of the electronic device or a folded state of the display, an active region of the display, and a direction in which a user looks at the display. The sensor module 320 may include at least some of elements and/or functions of the sensor module 176 in FIG. 1.

According to some embodiments, the sensor module 320 may detect whether the electronic pen 201 is attached or detached. For example, the sensor module 320 may detect whether the electronic pen 201 is attached or detached, based on a magnetic force change value, and transfer a detected installation/detachment signal of the electronic device to the processor 340.

According to an embodiment, the sensor module 320 may be identical or similar to the sensor module or the sensor circuit 299 included in the electronic pen 201. For example, in the case where the electronic pen 201 capable of communication is used, the sensor module 320 may be configured to control the electronic device 101 by using the sensor circuit 299 of the electronic pen 201.

The communication module 330 may perform establishment of short-range communication with the electronic pen 201 (e.g., a stylus pen removed from the electronic device or a stylus pen that is independent of the electronic device). The communication module 330 may communicate with the electronic pen 201 by using one of various short-range wireless communication methods, for example, Bluetooth low energy (BLE), but is not limited thereto. The communication module 330 may perform establishment of mutual communication in case that the electronic pen 201 is located at a distance allowing establishment of short-range communication. The communication module 330 according to various embodiments may include at least some of elements and/or functions of the communication module 190 in FIG. 1.

For example, the communication module 330 may receive electronic pen information (or sensor information) from the electronic pen 201. For example, the electronic pen information may include at least one of coordinate information and inclination information related to a hover input or action coordinate information related to an air command.

The processor 340 may be an element capable of performing calculation or data processing related to control and/or communication of each element of the electronic device 101, and may include at least some of elements and/or functions of the processor 120 in FIG. 1. Operations of the processor 340 described later may be performed by loading instructions stored in the memory 350.

The memory 350 may be connected to the processor 340 and store data and various instructions which the processor 340 is able to perform. Such instructions may include control commands such as arithmetic and logical operations, data transfer, or input/output which is able to be recognized by the processor 340.

The memory 350 may store a program for executing a function corresponding to a control signal caused by an input of the electronic pen 201 or a program (or application) supporting an electronic pen theme configuration.

According to an embodiment, the processor 340 may execute a pen theme application (hereinafter, app) and display, on the display 310, a user interface provided by the pen theme app. The pen theme app may be an app enabling change and/or configuration of graphic objects (e.g., an air command UI or an electronic pen pointer object) or a pen sound related to the electronic pen 201 according to a user's taste.

According to an embodiment, the processor 340 may control performing operations or functions related to the pen theme app. The processor 340 may display an electronic pen pointer in response to an electronic pen hover input. For example, the processor 340 may display a hover object (e.g., a dot pointer) configured by default. In case that a user changes an electronic pen pointer theme via a pen theme app, the processor 340 may display a transformed hover object (e.g., a transformed pointer) to which a pen theme is applied.

According to an embodiment, the processor 340 may consider at least one of a visual characteristic of an electronic pen pointer, an electronic pen context, and a display context to adaptively (or in real time or automatically) determine the direction and the coordinates of an electronic pen pointer displayed on the display 310 and change the position of the electronic pen pointer. Hereinafter, detailed operations of the processor 340 for automatic disposition of an electronic pen pointer will be described in FIG. 7.

Figure 4:
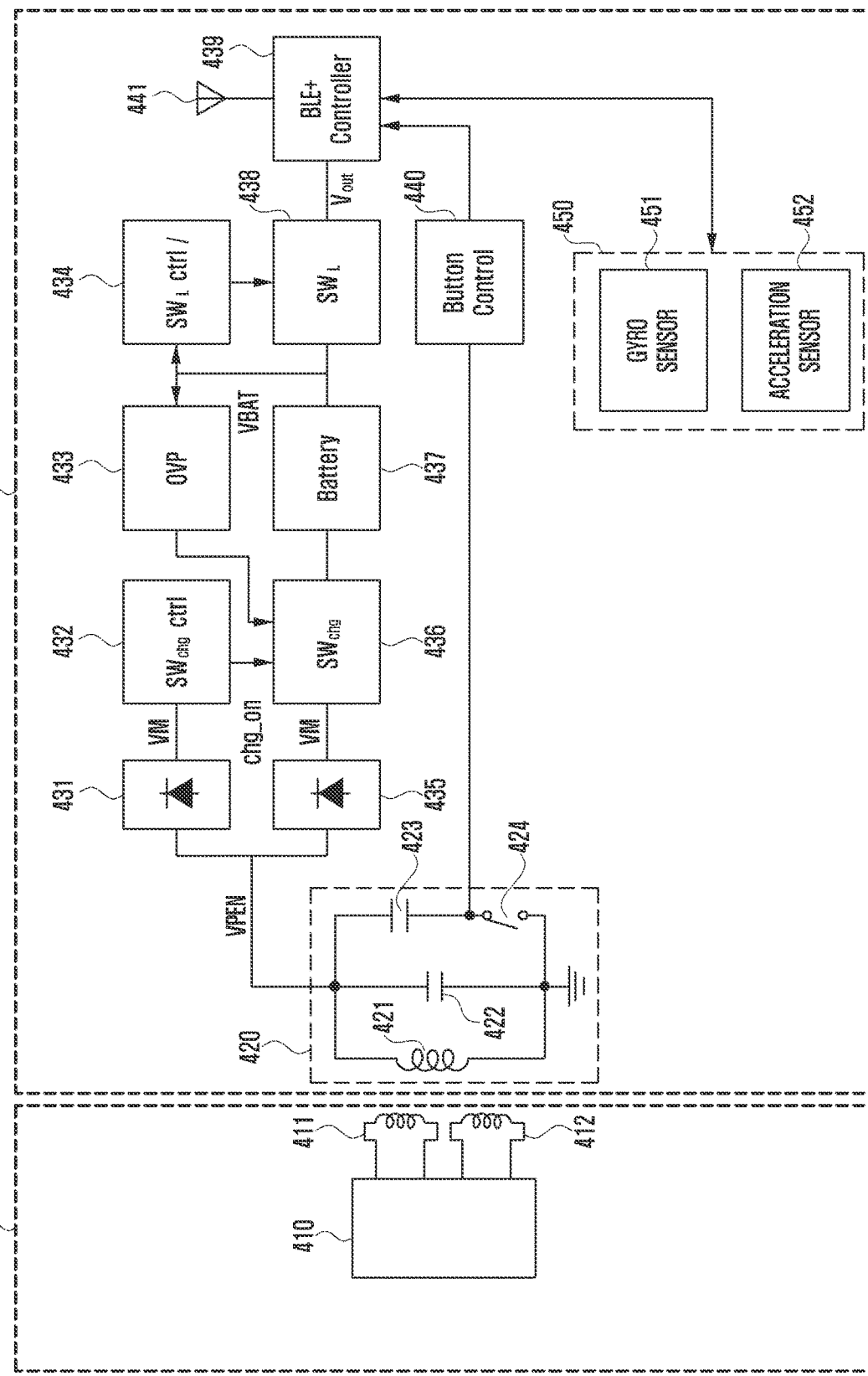
FIG. 4 is a diagram illustrating configurations of an electronic device and an external electronic device according to an embodiment of the disclosure.

FIG. 4 is a diagram illustrating configurations of an electronic device and an external electronic device according to an embodiment of the disclosure.

Referring to FIG. 4, according to an embodiment, an electronic device (e.g., the electronic device 101 in FIG. 1, 3, or 4) may communicate with an electronic pen (e.g., the electronic pen 201 in FIGS. 2 and 4). The electronic device 101 and the electronic pen 201 may communicate with a communication circuit by using at least one of various short-range wireless communication methods. For example, a short-range wireless communication method may be Bluetooth low energy (BLE) communication, but is not limited thereto.

The electronic device 101 may include a pen controller 410 (e.g., the processor 120 in FIG. 1 or the processor 340 in FIG. 3).

The pen controller 410 may include, for example, at least one amplifier connected to at least one coil 411 and 412. The pen controller 410 may include the at least one coil 411 and 412, and provide charging power to the electronic pen 201 through the at least one coil 411 and 412.

According to an embodiment, in case that the electronic pen 201 is inserted into an inner space of the electronic pen 201, the at least one coil 411 and 412 may be disposed to be physically adjacent to a coil 421 of the electronic pen 201, but the position of disposition is not limited. The insertion into the inner space is an example, and the electronic device 101 may also include a region (or space) allowing installation (or attachment) of the electronic pen 201 other than the inner space, and the electronic pen 201 may be detached from or attached to the region (or space). At least some functions of the pen controller 410 may be performed by the processor 120 or the pen controller 410 and the processor 120 may be implemented to be integrated with each other to perform at least some functions.

For example, the pen controller 410 may include a control circuit (e.g., a control circuit independent of the processor 120), an inverter, and/or an amplifier other than the at least one coil 411 and 412.

A resonance circuit 420 (e.g., the resonance circuit 287 in FIG. 2) of the electronic pen 201 may include the coil 421, at least one capacitor 422 and 423, and/or a switch 424. In case that the switch 424 is turned off, the coil 421 and the capacitor 422 may configure the resonance circuit, and in case that the switch 424 is turned on, the coil 421 and the capacitors 422 and 423 may configure the resonance circuit. Accordingly, the resonant frequency of the resonance circuit 420 may be changed according to on/off of the switch 424. For example, the electronic device 101 may identify on/off of the switch 424, based on the frequency of a signal from the electronic pen 201. For example, in case that a button of the electronic pen 201 is pushed/released, the switch 424 may be turned on/off, and the electronic device 101 may identify whether the button of the electronic pen 201 is pushed, based on the frequency of a reception signal identified via a digitizer.

At least one rectifier 431 and 435 may rectify and output a signal (VPEN) having an alternating current waveform output from the resonance circuit 420. A charging switch controller (SWchg ctrl) 432 may receive a rectified signal (VM) output from the rectifier 431. Based on a rectified signal (VM), the charging switch controller 432 may identify whether a signal generated in the resonance circuit 420 is a charging signal or a signal for position detecting. For example, the charging switch controller 432 may identify whether a signal generated in the resonance circuit 420 is a charging signal or a signal for position detecting, based on, for example, the magnitude of the voltage of the rectified signal (VM). Alternatively, the charging switch controller 432 may identify whether a signal having a pattern for charging initiation is input, based on the waveform of the rectified signal (VM).

A battery 437 may be changed using a received rectified signal (VIN). An over-voltage protection circuit (OVP) 433 may identify a battery voltage (VBAT), and when the battery voltage (VBAT) exceeds an over-voltage threshold, may control a charging switch 436 to be turned off.

A load switch controller (SW$_L$ ctrl) 434 may control a load switch (SW$_L$) 438 to be turned on, when it is identified that the battery voltage (VBAT) exceeds an operation voltage threshold. When the load switch 438 is turned on, power from the battery 437 may be transferred to a BLE communication circuit-and-controller (BLE+controller) 439 (e.g., the communication circuit 290 and the processor 220 in FIG. 2).

The BLE communication circuit-and-controller 439 may operate using received power. In case that the distance between the electronic pen 201 and the electronic device 101 is greater than a threshold distance, a button control circuit (button control) 440 may transfer information on an input on the button to the BLE communication circuit-and-controller 439. The BLE communication circuit-and-controller 439 may transmit received information on a button input to the electronic device 101 via an antenna 441 (e.g., the antenna 297 in FIG. 2).

A sensor 450 (e.g., the sensor circuit 299 in FIG. 2) may include a gyro sensor 451 and/or an acceleration sensor 452. Sensing data obtained by the gyro sensor 451 and/or the acceleration sensor 452 may be transferred to the BLE communication circuit-and-controller 439.

The BLE communication circuit-and-controller 439 may transmit a communication signal including received sensing data to the electronic device 101 via the antenna 441. Alternatively, the BLE communication circuit-and-controller 439 may identify information (e.g., the coordinates and/or displacement of the electronic pen 201) associated with the position of the electronic pen 201, identified based on received sensing data. The BLE communication circuit-and-controller 439 may transmit identified information associated with the position of the electronic pen 201 to the electronic device 101 via the antenna 441.

In case that the electronic pen 201 is drawn or detached from the electronic device 101, the BLE communication circuit-and-controller 439 may activate the acceleration sensor 452. In case that the button is pushed, the BLE communication circuit-and-controller 439 may activate the gyro sensor 451. The time point of the activation merely corresponds to an example, and there is no limit to a time point of activation of each sensor. The sensor 450 may further include a geomagnetic sensor. In case that only the acceleration sensor 452 is activated, the electronic pen 201 may provide acceleration information measured by the acceleration sensor 452 to the electronic device 101, and the electronic device 101 may also operate based on the acceleration information and the position of the electronic pen 201, identified based on a pen signal.

Figure 5:
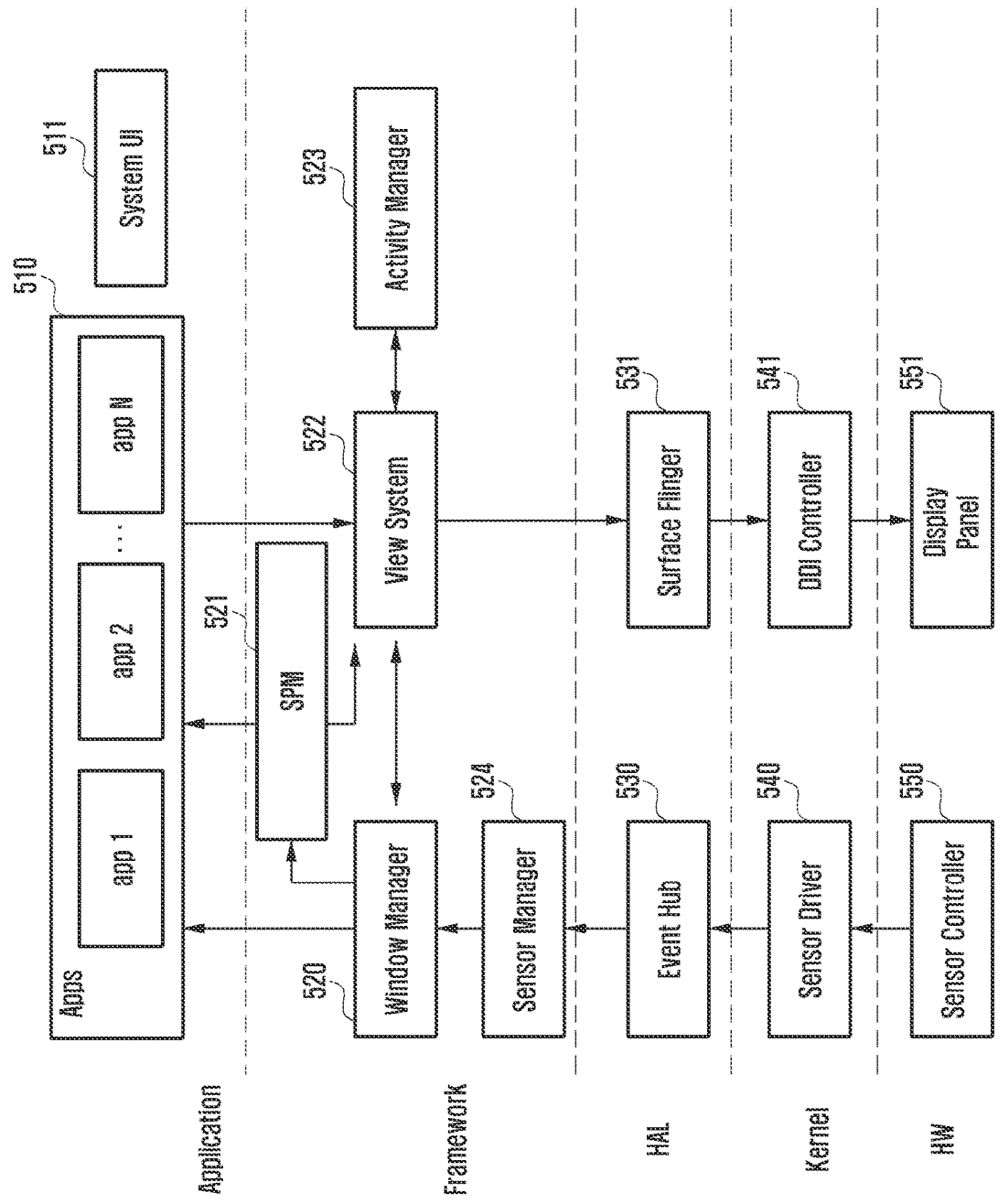
FIG. 5 illustrates a structure of an electronic pen theme platform of an electronic device according to an embodiment of the disclosure.

FIG. 5 illustrates a structure of an electronic pen theme platform of an electronic device according to an embodiment of the disclosure.

Referring to FIG. 5, an electronic device (e.g., the electronic device 101 in FIG. 1, 3, or 4) according to various embodiments may manage a theme of an electronic pen (e.g., the electronic pen 201 in FIGS. 2 and 4), based on an electronic pen theme framework (or theme platform). A configuration of the electronic device 101 illustrated in FIG. 5 may be implemented software-wise by being executed by a processor (e.g., the processor 120 in FIG. 1 or the processor 340 FIG. 3) and then being loaded in a memory (e.g., the memory 130 in FIG. 1 or the memory 350 in FIG. 3). For example, the configuration of the electronic device 101, implemented software-wise, may be divided into an application layer, a framework layer, a hardware abstraction layer (HAL), a kernel driver layer, and/or a hardware (HW) layer.

The application layer may include applications 510 and a system user interface (UI) 511. The applications 510 may include an application which is installed or is executable by a processor, or stored in a memory of the electronic device 101, for example, app1, app2, . . . , or appN, and one of them is an electronic pen theme app, and may be an application providing interaction with a user for an electronic pen theme configuration. The system user interface 511 may be an application controlling a system of the electronic device 101, for example, display of a common function or a common region (fixed region/part) of a screen. For example, the system user interface 511 may manage a screen related to a quick view, or a notification bar.

The framework layer may include a window manager 520, a pen theme manager (stylus pointer manager (SPM)) 521, a view system 522, an activity manager 523 and/or a sensor manager 524. The window manager 520 may manage one or more GUI resources used in a screen. For example, the window manager 520 may transfer information of a display region of the electronic device 101 to the application 510.

The pen theme manager 521 may manage resources used in a theme of the electronic pen 201. The pen theme manager 521 may perform overall management of a theme of the electronic pen 201, such as update or change of a configuration of a user interface related to the electronic pen 201. For example, the pen theme manager 521 may control a change of position and display of a pointer (e.g., an integrated hover object) of the electronic pen 201.

The view system 522 may include a set of extensible views used to create a user interface of the application 510. The activity manager 523 may control a life cycle and an activity stack of the application 510. The sensor manager 524 may control sensor information.

The hardware abstraction layer (HAL) is an abstracted layer between multiple hardware modules included in the hardware layer and software of the electronic device 101, and may include an even hub 530 and a surface flinger 531. The event hub 530 may be an interface obtained by standardizing an event occurring in a touch circuit and a sensor circuit. The surface flinger 531 may synthesize multiple layers, and provide data showing synthesized multiple objects to a display controller. The display controller may indicate a graphic display controller.

The kernel layer may include various drivers for controlling various hardware modules included in the electronic device 101. For example, the kernel layer may include a sensor driver 540 controlling a sensor controller connected to a sensor, and a display controller 541 controlling a display panel, but is not limited thereto. The hardware layer may include a hardware module or element included in the electronic device 101, for example, a sensor controller 550 and a display panel 551, and may include at least some of the elements illustrated in FIG. 1.

The electronic device 101 according to various embodiments may include: a display (e.g., the display module 160 in FIG. 1 or the display 310 in FIG. 3); and a processor (e.g., the processor 120 in FIG. 1 or the processor 340 in FIG. 3), wherein the processor is configured to perform control to: detect an input of an electronic pen, and display an electronic pen pointer on the display in response to the input of the electronic pen; identify first information related to a visual feature of the electronic pen pointer; identify second information related to at least one of context information of the electronic pen and context information of the display; compare the first information with the second information to determine a direction and coordinates for change of a position of the electronic pen pointer; and change display of the electronic pen pointer to the determined direction and coordinates.

According to various embodiments, the electronic pen pointer may be a graphic object generated through an electronic pen theme allowing change of at least one of a size, a shape, a type, and a color of the pointer, and the graphic object may include at least one of a direction indicator and a custom object.

According to various embodiments, the direction indicator may include an object showing hover position information of the electronic pen or indicating the hover position, and the custom object may include at least one of an icon, an image, a two-dimensional object, an emoji, a three-dimensional object, a character, a sticker, an avatar, and an emoticon.

According to various embodiments, the processor may be configured to identify the first information through at least one of a region in which the electronic pen pointer is displayed on the display, and position information of the displayed region, direction information or azimuth information of the direction indicator or the custom object, feature information of the custom object, and relative position information between the direction indicator and the custom object.

According to various embodiments, the electronic device 101 may further include a communication module (e.g., the communication module 190 in FIG. 1 or the communication module 330 in FIG. 3), wherein the processor is configured to receive electronic pen information from the electronic pen via the communication module, and identify the second information through one of coordinate information of the electronic pen, inclination information of the electronic pen, inclination direction information of the electronic pen, and holding direction information of a hand holding the electronic pen, which are identified through the received electronic pen information.

According to various embodiments, the electronic device 101 may further include a sensor module (e.g., the sensor module 176 in FIG. 1 or the sensor module 320 in FIG. 3), wherein the processor is configured to receive context information of the display via the sensor module, and identify the second information through one of structure change information of the display, active region information of the display, boundary region or joint region information of the display, and information on a multi-window region displayed on the display, which are identified through the received display context information.

According to various embodiments, the processor may be configured to predict whether the electronic pen or a hand holding the electronic pen overlaps the electronic pen pointer, based on the first information and the second information, and in case that a result of the prediction indicates the electronic pen pointer overlapping the electronic pen or the hand holding the electronic pen, determine, as the direction and coordinates, a position at which there is no overlap with the electronic pen or the hand holding the electronic pen.

According to various embodiments, the processor may be configured to predict whether the electronic pen pointer is positioned in a region in which display is restricted in the display, based on the first information and the second information, and in case that a result of the prediction indicates the electronic pen pointer being positioned in the region in which display is restricted in the display, determine, as the direction and coordinates, a position deviating from the region in which display is restricted in the display.

According to various embodiments, the processor may be configured to predict whether the electronic pen or a hand holding the electronic pen overlaps the electronic pen pointer, based on the first information and the second information, predict whether the electronic pen pointer is positioned in a region in which display is restricted in the display, and according to a result of the prediction, determine, as the direction and coordinates, a position at which there is no overlap with the electronic pen or the hand holding the electronic pen, and a position deviating from the region in which display is restricted in the display.

According to various embodiments, the display may include a touch-sensitive display, and may further include a digitizer panel receiving an input of the electronic pen.

Figure 6:
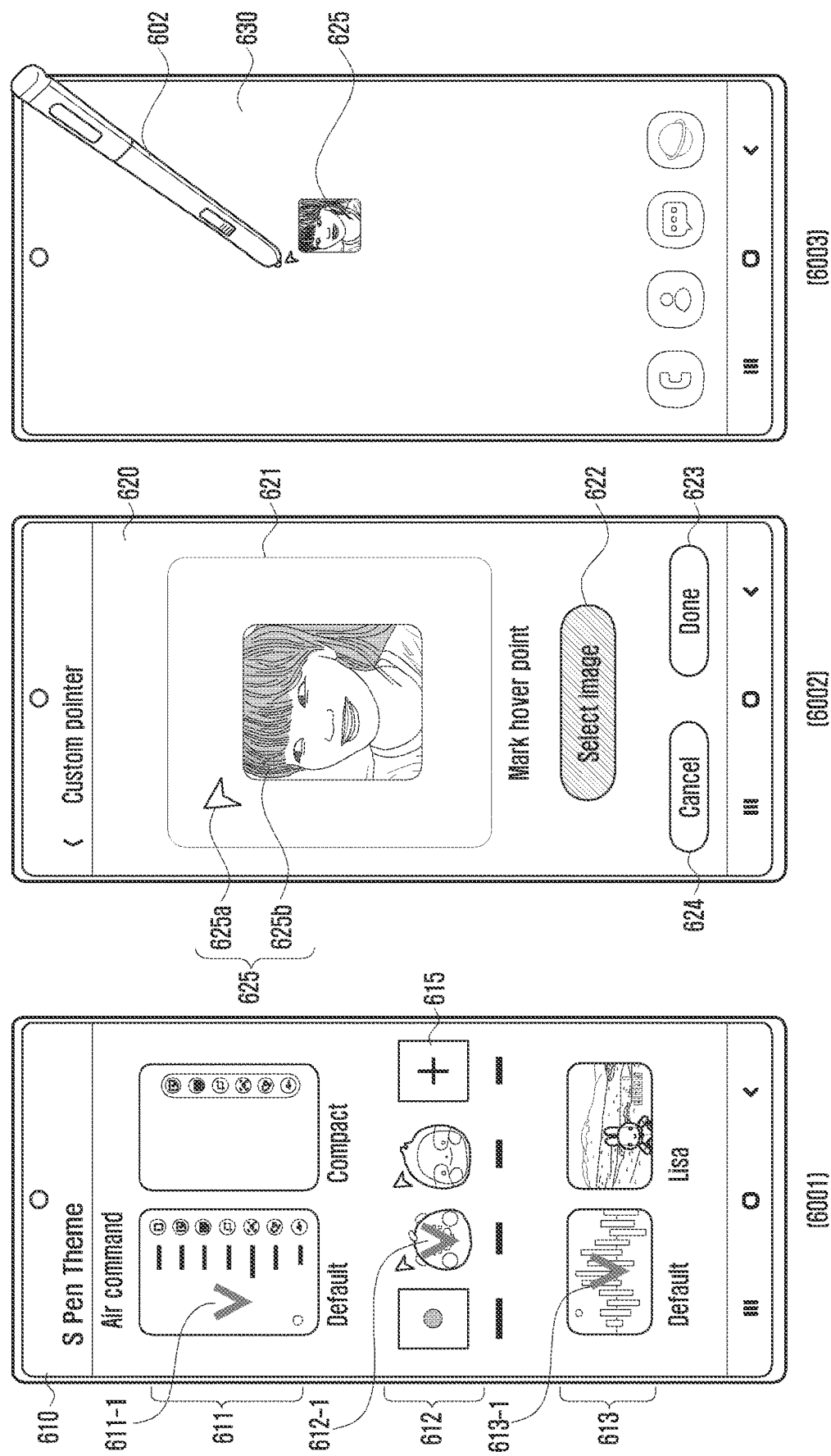
FIG. 6 illustrates electronic pen theme operation screens of an electronic device according to an embodiment of the disclosure.

FIG. 6 illustrates electronic pen theme operation screens of an electronic device according to an embodiment of the disclosure.

Referring to FIG. 6, according to an embodiment, an electronic device (e.g., the electronic device 101 in FIG. 1, 3, or 4) may support an electronic pen theme function of an electronic pen (e.g., the electronic pen 201 in FIGS. 2 and 4 or an electronic pen 602 in FIG. 6). For example, the electronic device 101 may support an electronic pen theme configuration mode, and provide a user interface (UI) for change of an electronic pen theme configuration through a display (e.g., the display module 160 in FIG. 1 or the display 310 in FIG. 3). A UI for change of an electronic pen theme configuration, illustrated in FIG. 6, merely corresponds to an example for explanation, is not limited thereto, and may be implemented in various examples according to the electronic device 101.

A user may provide a function of changing an air command theme, a hovering pointer, and/or a pen sound of the electronic pen 602 via the electronic pen theme configuration mode, but this merely corresponds to an example. A user may also provide change of different functions related to the electronic pen 602.

According to an embodiment, as illustrated in view 6001, an electronic pen theme configuration UI 610 may include an air command theme list 611, an electronic pen pointer theme list 612, or a pen sound theme list 613. The air command theme list 611 may include various themes allowing change and/or configuration of an air command theme. The air command theme may indicate an air command execution menu (e.g., action memo, scrap book, write after capture, or search) UI theme displayed by a button click (e.g., an operation of pressing and releasing a button) after bringing the electronic pen 602 close to the display within a configured distance allowing detection of a hover input. When a user selects one of the themes, the selected theme is configured as a selected air command theme, and the theme is changed to the configured air command theme, and then be displayed on the display. The selected air command theme may be marked with a check (v) 611-1 to be visually distinguished from non-selected different themes, and as another example, the border thereof may be processed to be thick. As air command themes, pre-designed themes may be displayed in the electronic pen theme configuration UI 610, and an air command theme updated from a theme server (e.g., the server 108 in FIG. 1) or downloaded by a user may be displayed.

The pen sound theme list 613 may include various pen sound themes allowing change and/or configuration of output of a pen sound in relation to an input of the electronic pen 602. When a user selects one of the theme, a pen sound configuration may be changed to the selected pen sound theme. The selected pen sound theme may be marked with a check (v) 613-1 to be visually distinguished from non-selected different pen sound themes, and as another example, the border thereof may be processed to be thick. Also as the pen sound theme, a theme updated from a server or downloaded by a user may be displayed.

The electronic pen pointer theme list 612 may include a theme of a pointer object, for example, various pointer themes allowing change and/or configuration of at least one of the size, the shape, the type, and the color of the electronic pen 602 in relation to a hover input of the electronic pen 602. The pointer themes may include a default pointer theme (e.g., a dot shape or a circular region based on a hover point), a designated (or pre-designed) transform pointer theme, and/or a direction pointer theme. When a user selects one of the themes, the selected theme may be marked with a check (v) 612-1 to be visually distinguished from non-selected different themes. The selected theme is configured as a selected electronic pen pointer theme, and the theme is changed to the configured electronic pen pointer theme, and then be displayed on the display. For example, in case that a user selects a transform pointer theme, the electronic device may display a configured transform pointer on the display in response to a hover input.

According to an embodiment, a transform pointer (or a transform hover object, a theme pointer object) may include a direction indicator and a custom object, but this merely corresponds to an example. A shape indicating a direction and an object may be represented in a single form. The relative position between the direction indicator and the custom object may be fixedly displayed by default. For example, as illustrated in the electronic pen pointer theme list 612, the custom object is displayed in a center region, and the direction indicator may be fixed to be displayed at a position in the north-west direction (e.g., 11 o'clock direction) with respect to the custom object.

The direction indicator may be a graphic object showing hover position information (e.g., coordinate information (x,y)) of the electronic pen 602 or indicating a hover position. A user may recognize an end (e.g., a pen tip) of the electronic pen 602 through the direction indicator. The custom object may be an object represented to improve a user's cognitive effect for a pointer position together with the direction indicator, and may be paired with the direction indicator and be display together on the display. The custom object may be represented by at least one of an icon, an image, a two-dimensional object, an emoji, a three-dimensional object, a character, a sticker, an avatar, and an emoticon. The electronic pen theme configuration UI 610 may support a pointer theme generation item 615 allowing generation of a personalized transform pointer theme. When a user selects the transform pointer theme generation item 615, the electronic device 101 may display a transform pointer theme generation UI 620 on the display as illustrated in view 6002. The transform pointer theme generation UI 620 may include a display region 621 in which a transform pointer (or transform pointer theme) 625 is displayed, a selection item 622 supporting selection of an image included in the transform pointer theme 625, a storage item 623 for generating the selected transform pointer theme 625, or a cancel item 624 allowing cancel of generation of the transform pointer theme 625. For example, a + shape may be displayed in the display region 621 by default. When a user calls an image (e.g., an image stored in the electronic device 101 or an image generated via a camera) or an icon (or an emoji, an emoticon, or a sticker) by selecting the + shape or the selection item 622, the image called by the user may be displayed in the display region 621. The called image (or icon) may be designated as a custom object 625*b*. A direction indicator 625*a* included in the display region 621 may be selected and then configured to have a different shape (e.g., an arrow, a circle, a triangle, or a heart).

According to an embodiment, the direction indicator 625*a* may be designated to be at one of positions in four directions (north-east, north-west, south-east, and south-west) in the display region 621, and the relative position between the custom object 625*b* and the direction indicator 625*a* may be stored by default according to a position displayed on the display region 621.

After designating the direction indicator 625*a* and the custom object 625*b* in the display region 621, when a user selects the storage item 623, the electronic device 101 may generate a personalized transform pointer theme 625. The generated custom transform pointer theme 625 may be added to the electronic pen pointer theme list 612 of the electronic pen theme configuration UI 610. A user may select the generated custom transform pointer theme 625 to configure the generated custom transform pointer theme as an electronic pen pointer theme.

According to an embodiment, the electronic device 101 may support a function of adjusting the size of one pointer object.

As illustrated in view 6003, in case that a hover input or an air command input of the electronic pen 602 is received on a home screen 630, the electronic device 101 may display an electronic pen point configured by the generated transform pointer theme 625 on the home screen 630 to correspond to the position of the electronic pen 602.

The electronic device 101 according to various embodiments may automatically dispose and display the direction and position of an electronic pen pointer (e.g., a transform pointer or a transform hover object), based on a visual characteristic of the electronic pen pointer, a context of the electronic pen, or a display context. Hereinafter, a method of automatically disposing the direction and position of an electronic pen pointer will be described.

Figure 7:
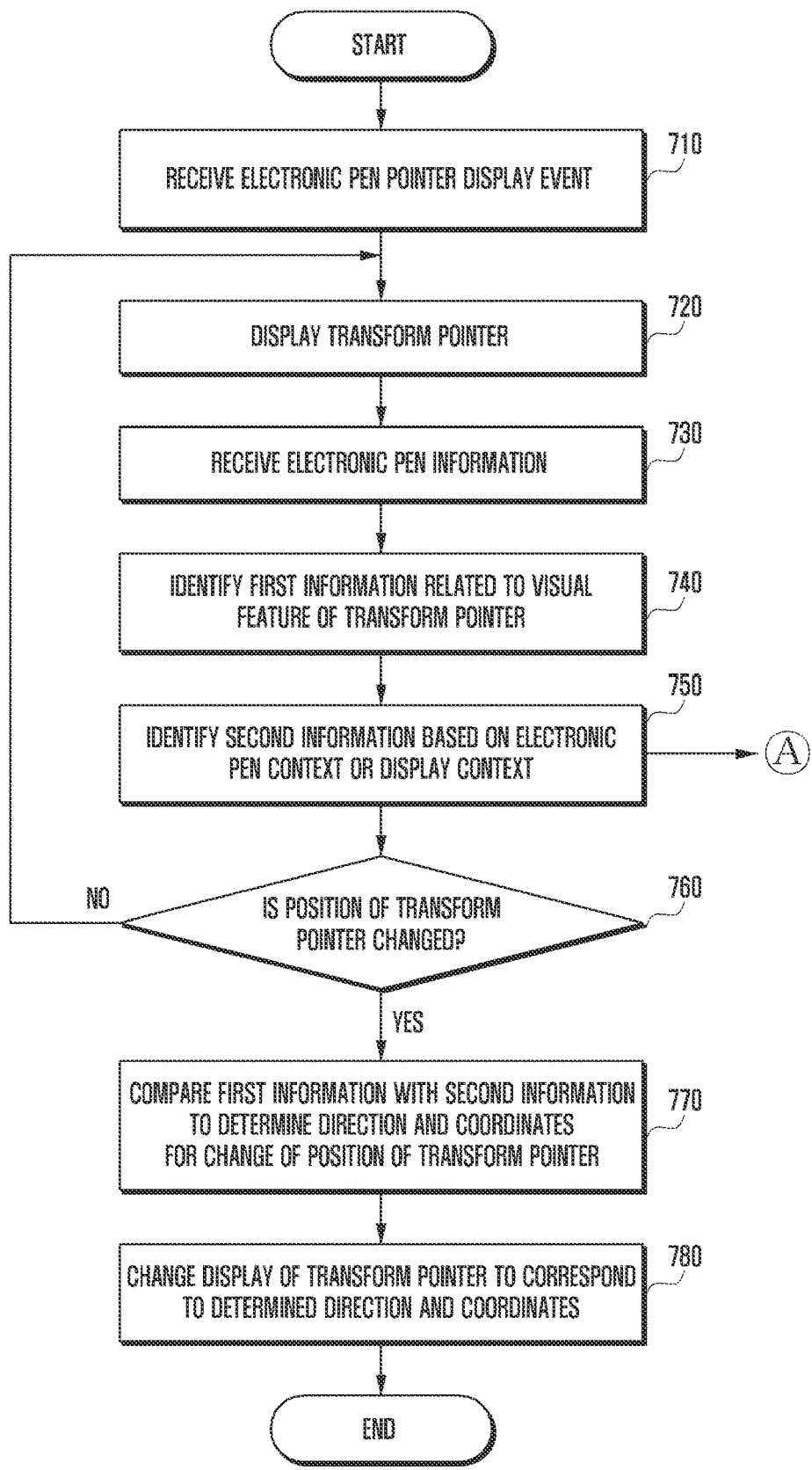
FIG. 7 is a flowchart illustrating a method for displaying an electronic pen pointer of an electronic device according to an embodiment of the disclosure.

FIG. 7 is a flowchart illustrating a method for displaying an electronic pen pointer of an electronic device according to an embodiment of the disclosure.

Referring to FIG. 7, a processor (e.g., the processor 120 in FIG. 1 or the processor 340 in FIG. 3) of an electronic device (e.g., the electronic device 101 in FIG. 1, 3, or 4) according to an embodiment may, in operation 710, receive an electronic pen pointer display event. The electronic pen pointer display event may be recognized when a hover input of an electronic pen (e.g., the electronic pen 201 in FIGS. 2 and 4) or an air command of the electronic pen 201 is input.

According to an embodiment, a user may allow the electronic pen 201 to hover over a screen displayed on a display of the electronic device 101 before directly touching the display. When the electronic pen 201 is close to a screen (e.g., a digitizer panel), for example, enters within a predetermined range (or a threshold depth value, a predetermined height distance) from a surface of a display (e.g., the display 310 in FIG. 3), the processor 340 may detect a hover input of the electronic pen 201 and receive an electronic pen pointer display event.

According to an embodiment, in case that a user makes the electronic pen 201 close to the display within the predetermined range while a button of the electronic pen 201 is pushed, the processor 340 may receive an electronic pen pointer display event. According to an embodiment, in case that an air command function (in other words, a laser mode/highlight mode of the electronic pen) of the electronic pen 201 is activated, the processor 340 may receive an electronic pen pointer display event. For example, the electronic pen 201 may provide, to the electronic device 101, information of the electronic pen 201 through wireless communication with the electronic device 101 when an air command is input. When an air command function is activated, the processor 340 may display an electronic pen pointer (e.g., a default hover pointer or a transform pointer) on the display, and when the air command function is deactivated, displaying of the electronic pen pointer on the display may be terminated.

In operation 720, the processor 340 may display an electronic pen pointer, for example, a transform pointer in response to the electronic pen pointer display event. For example, the processor 340 may display a transform pointer on the display at a hover position of the display at a time point of entrance of the electronic pen 201 within a predetermined range from the surface of the display on which a hover input is detected. The transform pointer may be a transform pointer (e.g., the transform pointer 625 in FIG. 6) configured via the electronic pen theme configuration UI 610 described with reference to FIG. 6. For example, the transform pointer 625 may include a direction indicator (e.g., the direction indicator 625*a* in FIG. 6) and/or a custom object (e.g., the custom object 625*b* in FIG. 6), but is not limited thereto. For example, the transform pointer 625 may be an object obtained by relatively enlarging one pointer object compared to a default size. The relative position between the direction indicator 625*a* and/or the custom object 625*b* of the transform pointer 625 is configured by default, and the processor 340 may display the transform pointer 625 configured by default on the display.

According to some embodiments, in the description for FIG. 7, operation 730 to operation 780 are described to be performed while the transform pointer 625 is displayed. However, operation 720 may be omitted, and operation 730 to operation 780 may be performed in response to a pointer display event of the electronic pen 201, and then the transform pointer 625 may be displayed.

In operation 730, the processor 340 may receive information of the electronic pen 201 in relation to the electronic pen pointer display event.

According to an embodiment, the processor 340 may receive hover position coordinate information and sensor information at a time point of start of a hovering input from the electronic pen 201 in relation to a hover input. The sensor information may include inclination information of the electronic pen 201, based on an acceleration sensor (e.g., the acceleration sensor 452 in FIG. 4) and/or a gyro sensor (e.g., the gyro sensor 451 in FIG. 4) included in the electronic pen 201. The inclination information of the electronic pen 201 may include three-dimensional values, for example, values of X, Y, and Z, or values of roll (F), pitch (0), and yaw (W).

According to another embodiment, the processor 340 may also receive air command coordinate information, inclination information of the electronic pen 201, button information of the electronic pen 201 via a communication module (e.g., the communication module 190 in FIG. 1 or the communication module 330 in FIG. 3) in relation to an air command input.

In operation 740, the processor 340 may identify first information related to a visual feature of the transform pointer. The first information may include a visual feature with which the transform pointer 625 is displayed on the display, for example, at least one of a range (size) in which and a position at which the custom object 625b is displayed on the display, an azimuth indicated by the direction indicator 625a, a feature (e.g., facial expression, eye position, or azimuth/direction) of the custom object 625b, and the relative position between the custom object 625b and the direction indicator 625a.

In operation 750, the processor 340 may identify second information based on at least one of a context of the electronic pen 201 and a display context. The second information may include context information of the electronic pen 201 or the display for determining a factor affecting visibility or display of the transform pointer 625 displayed on the display, for example, coordinate information of the electronic pen 201, inclination information of the electronic pen 201, an inclination direction of the electronic pen 201, a holding direction of a hand holding the electronic pen 201, hand position information, structure change information of the display, display active region information, a physical feature of the display, display boundary region or joint region information, and multi-window region information.

In operation 760, the processor 340 may determine whether to change the position of the transform pointer.

According to an embodiment, the processor 340 may determine whether to change the position of the transform pointer 625, based on the first information and/or the second information.

According to an embodiment, the processor 340 may predict, based on a visual characteristic of the transform pointer 625 and a holding direction of the hand, whether the transform pointer 625 currently displayed on the display is partially overlapped with a hand holding the electronic pen 201 and thus, in other words, at least a part of the transform pointer 625 is hidden from a user's sight by a hand holding the electronic pen 201. The processor 340 may predict whether there is a region (e.g., a boundary region, a joint region, or a window region) in which display of the transform pointer 625 is at least partially restricted, according to display context information.

In a situation where, according to a prediction result, the transform pointer 625 displayed on the display is at least partially hidden by the electronic pen 201 and a hand, or at least a part thereof is displayed in a restricted region of the display, the processor 340 may determine to change the position of the transform pointer 625.

According to an embodiment, in case that the position of the transform pointer 625 is determined not to be changed, the processor 340 may return to operation 720.

In operation 770, the processor 340 may compare the first information with the second information to determine a direction and coordinates for change of the position of the transform pointer. In operation 780, the processor 340 may change display of the transform pointer and display same to correspond to the determined direction and coordinates.

Additionally, the processor 340 may display the transform pointer 625 while tracking the trajectory of the transform pointer 625 in response to a movement of a hover input or an air command input of the electronic pen 201, and may repeatedly perform operation 730 to operation 780 described above according to the movement of the transform pointer 625, thereby adaptively (or in real time or automatically) displaying the direction and/or the position of the transform pointer 625.

Figure 8:
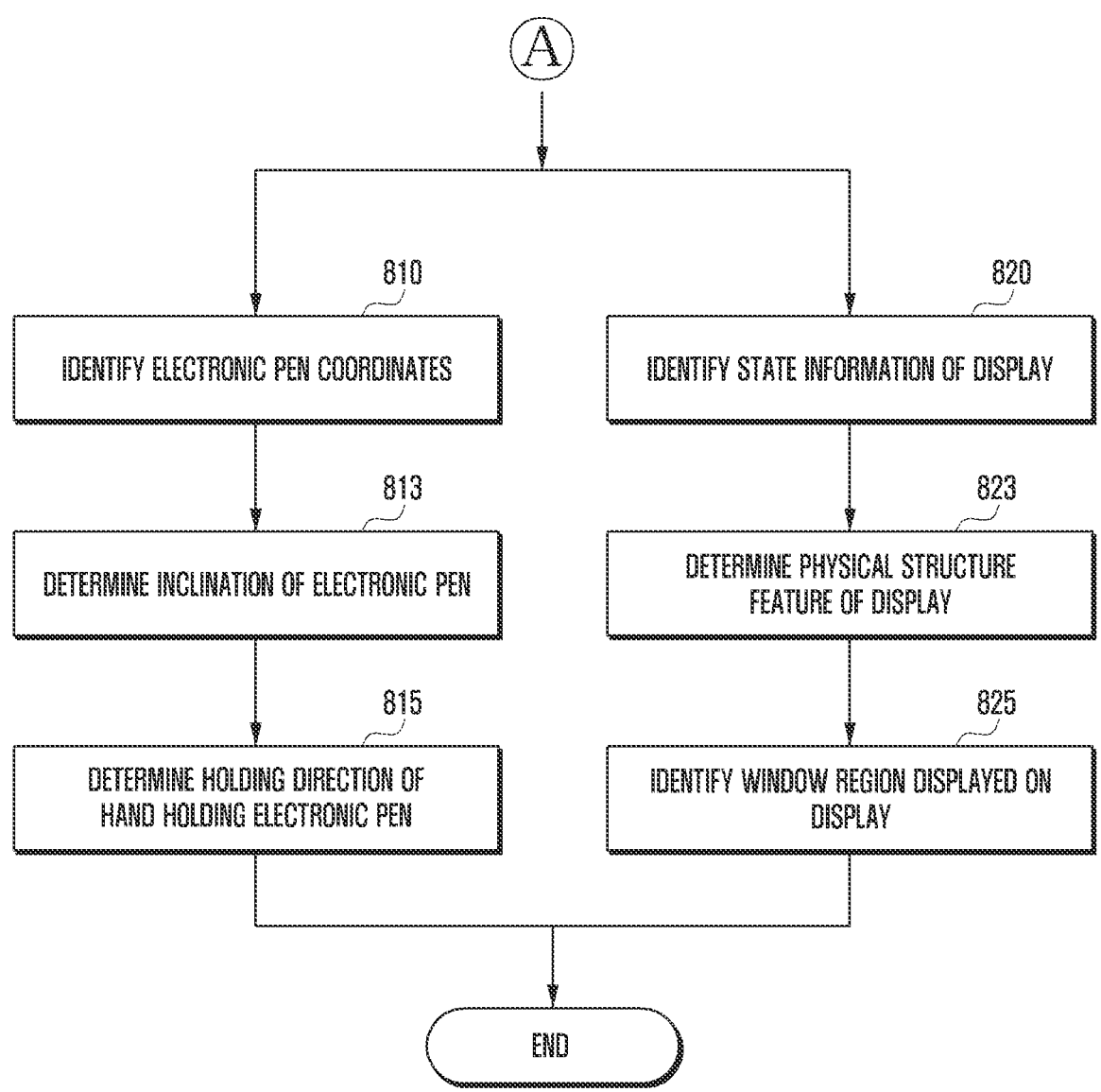
FIG. 8 is a flowchart illustrating operation 750 in FIG. 7 in detail according to an embodiment of the disclosure.

FIG. 8 is a flowchart illustrating operation 750 in FIG. 7 in detail according to an embodiment of the disclosure.

Referring to FIG. 8, the electronic device 101 according to an embodiment may independently, parallelly, or sequentially perform operations (operation 810 to operation 815) for identifying context information of the electronic pen 201 and operations (operation 820 to operation 825) for identifying context information of the display. According to some embodiments, operation 820 to operation 825, or operation 820 and operation 823 may be omitted according to a type (e.g., a bar type, a flat type, a foldable type, a rollable type, a slidable type, or a multi-window support/non-support type) of the electronic device 101.

In operation 810, the processor 340 of the electronic device 101 may identify coordinate information on the position of a hover input of the electronic pen 201. For example, the processor 340 may receive coordinate information from a digitizer panel or the electronic pen 201.

In operation 813, the processor 340 may determine the inclination of the electronic pen 201 to identify in inclination information (e.g., a tilt angle) and an inclination direction. For example, the processor 340 may compare three-dimensional information (e.g., values of X, Y, and Z, or values of roll (F), pitch ($\theta$), and yaw ($\Psi$)) received from information of the electronic pen 201 with stored data to determine a direction in which and an angle at which the electronic pen 201 is inclined.

In operation 815, the processor 340 may determine a holding direction of a hand holding the electronic pen 201. Alternatively, the processor 340 may also determine a holding direction of the hand, based on sensor information (e.g., touch-sensitive capacitance change or infrared rays). For example, the processor 340 may determine left hand holding or right hand holding, based on a direction in which the electronic pen 201 is inclined.

Independently, in operation 820, the processor 340 may identify display state information. For example, the processor 340 may identify at least one of a hinge angle, a hinge direction, and/or an activated display region caused by display structure transform (e.g., rollable display transform or foldable display transform), based on sensor information obtained via a sensor module (e.g., the sensor module 320 in FIG. 3).

In operation 823, the processor 340 may determine a physical structure feature of the display. For example, the processor 340 may determine a boundary region or a joint region according to display structure transform.

According to some embodiments, in case that the electronic device 101 is a foldable electronic device and a first display (or first housing) and a second display (or second housing) of the foldable electronic device are folded on each other at a designated angle, a pre-configured range or region based on a boundary line (or folding line) on which the first display (or first housing) and the second display (or second housing) are in contact or connected with each other may be determined as a boundary region or a joint region.

According to some embodiments, in case that the electronic device 101 is a slidable electronic device (or rollable electronic device) and at least a part of the display is received, a pre-configured range or region based on the boundary line between an activated display region (e.g., main region) and a deactivated display region (e.g., sub region) may be determined as a boundary region or a joint region.

In operation 825, the processor 340 may identify a window region displayed on the display. For example, the processor 340 may identify a window region in which an app activated by a transform pointer is displayed in a case of a multi-window. The processor 340 may perform control such that a transform pointer is displayed only in a window region in which an activated app is displayed.

According to some embodiments, the processor 340 may display an electronic pen pointers or a transform pointer with different themes for an app activated in each window region in a case of a multi-window. For example, in case that a note app is activated in a first window region of a multi-window, a transform pointer based on a hover input within the first window region may be a pen icon, and in case that a web browser is activated in a second window region, a transform pointer based on a hover input within the second window region may be an arrow icon.

Figure 9:
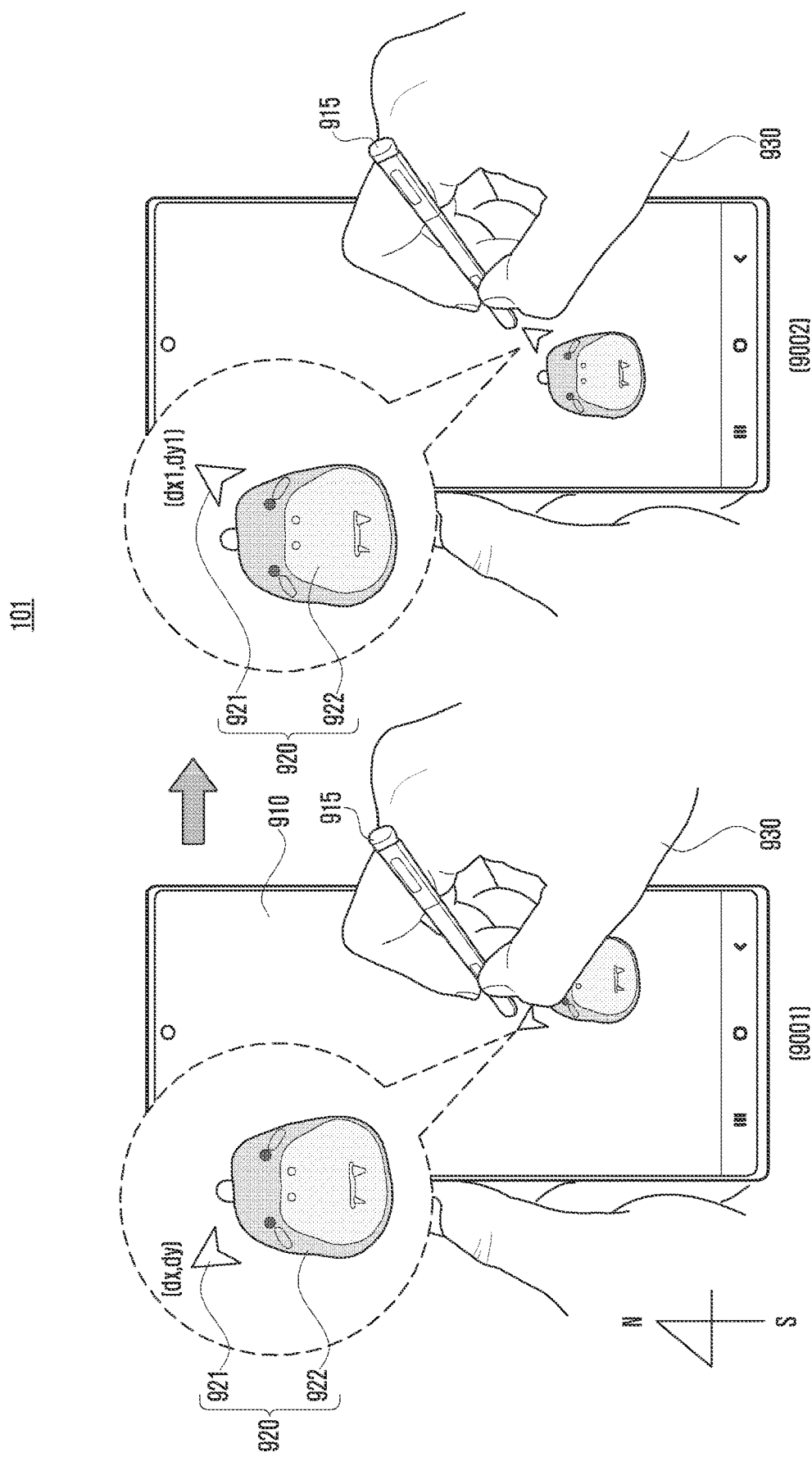
FIG. 9 illustrates an embodiment of displaying an electronic pen pointer according to an electronic pen context of an electronic device according to an embodiment of the disclosure.

FIG. 9 illustrates an embodiment of displaying an electronic pen pointer according to an electronic pen context of an electronic device according to an embodiment of the disclosure.

Referring to FIG. 9, the processor 340 of an electronic device (e.g., the electronic device 101 in FIG. 1, 3, or 4) according to an embodiment may display an electronic pen pointer, for example, a transform pointer 920 (e.g., the transform pointer 625 in FIG. 6) configured in a display screen 910, corresponding to a hover input (or air command input) of an electronic pen 915 (e.g., the electronic pen 201 in FIGS. 2 and 4). The transform pointer 920 may include a direction indicator 921 (e.g., the direction indicator 625a in FIG. 6) and a custom object 922 (e.g., the custom object 625b in FIG. 6). The relative position between the direction indicator 921 and the custom object 922 may be displayed by a position and direction configured by default.

For example, as illustrated in view 9001, in case that an input of the electronic pen 915 (or electronic pen tip) corresponds to a first position (dx, dy), the direction indicator 921 may be displayed at the first position or displayed to indicate the first position, and the custom object 922 may be displayed at a relative position (e.g., a designated electronic pen pointer theme) configured by default.

In displaying the transform pointer 920, as illustrated in view 9001, a part of the transform pointer 920 may be hidden from a user's sight according to the position of the electronic pen 915 and a hand 930 holding the electronic pen 915.

The electronic device 101 may identify context information of the electronic pen 915 to predict a context in which the transform pointer 920 is overlapped and hidden from a user's sight by the hand 930. The electronic device 101 may identify the inclination of the electronic pen 915, a holding direction of the hand 930, and a visual feature with which the transform pointer 920 is displayed on the display screen 910, and change and dispose the direction and coordinates of the transform pointer 920 to a position at which there is no overlap with the electronic pen 915 or the hand holding the electronic pen 915. As illustrated in view 9002, in case that a user makes an hover input with the electronic pen 915 while holding the electronic pen 915 with the right hand, the electronic device 101 may control such that the direction indicator 921 of the transform pointer 920 is automatically disposed at a position (dx1, dy1) in the north-east direction from a position (dx, dy) in the north-west direction with respect to the custom object 922, and the custom object 922 is automatically disposed at a position (e.g., a position at which there is no overlap with the right hand) deviating from the position of the right hand.

Figure 10:
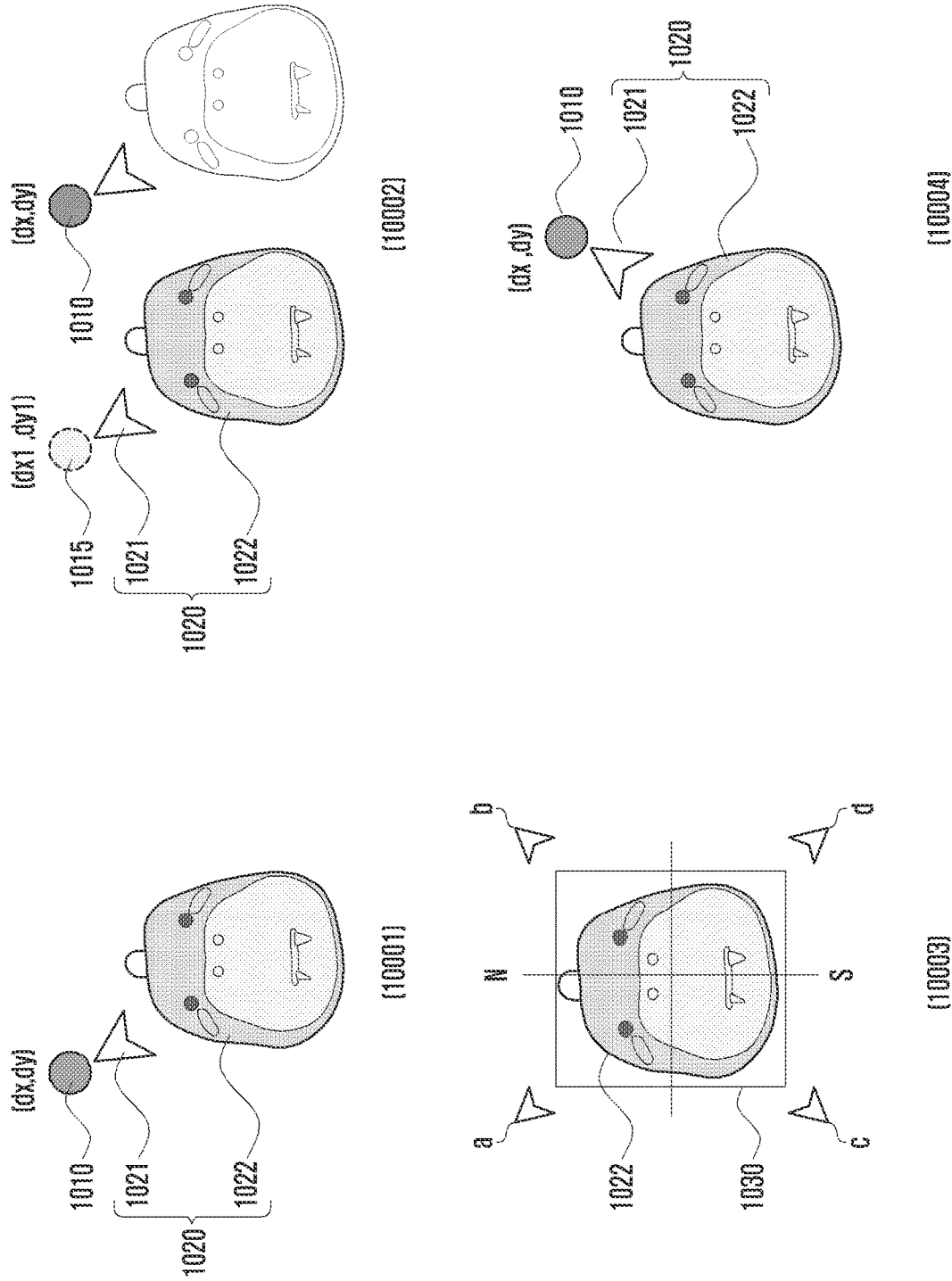
FIG. 10 is a flowchart illustrating operations for displaying an electronic pen pointer of an electronic device according to an embodiment of the disclosure.

FIG. 10 is a flowchart illustrating operations for displaying an electronic pen pointer of an electronic device according to an embodiment of the disclosure. The operations illustrated in FIG. 10 merely correspond to an example for convenience of explanation, but the disclosure is not limited thereto.

Referring to FIG. 10, according to an embodiment, an electronic device (e.g., the electronic device 101 in FIG. 1, 3, or 4) may support an electronic pen pointer to be automatically disposed at a position at which there is no overlap with an electronic pen (e.g., the electronic pen 201 in FIGS. 2 and 4) or a hand holding the electronic pen 201.

For example, the electronic pen pointer may be a transform pointer 1020 including a direction indicator 1021 and a custom object 1022, the relative position of which is designated by default. For example, as in view 10001, in case that a hover point 1010 of the electronic pen 201 (or electronic tip) is at a first position (dx, dy), the direction indicator 1021 may be displayed at a position and in a direction indicating the first position, and the custom object 1022 may be displayed in the south-east direction (e.g., five o'clock direction) with respect to the direction indicator 1021.

For example, not illustrated in FIG. 10, the electronic pen 201 may be inclined in the right direction, and the electronic pen 201 may be held by the right hand. In this case, the electronic device 101 may, as in view 10002, first determine to move the transform pointer 1020 from the first position (dx, dy) to a second position (dx1, dy1) to correspond to inclination information of the electronic pen 201. Thereafter, the electronic device 101 may, as in view 10003, designate a virtual rectangular region 1030 surrounding the custom object 1022 and identify positions a, b, c, and d of the direction indicator 1021 at each corner portion of the rectangular region 1030. For example, view 10003 has been illustrated for convenience of explanation, and the electronic device 101 may identify positions of a direction indicator software-wise.

Thereafter, the electronic device 101 may designate the position (e.g., b) of the direction indicator 1021 in consideration of a movement of the custom object 1022 and the position of the hover point 1010. The electronic device 101 may display the transform pointer 1020 having the direction indicator 1021, the position of which is changed to be positioned in the north-east direction (or one o'clock direction) from the north-west direction (or eleven o'clock direction), as illustrated in view 10004, with respect to the custom object 1022.

Figure 11:
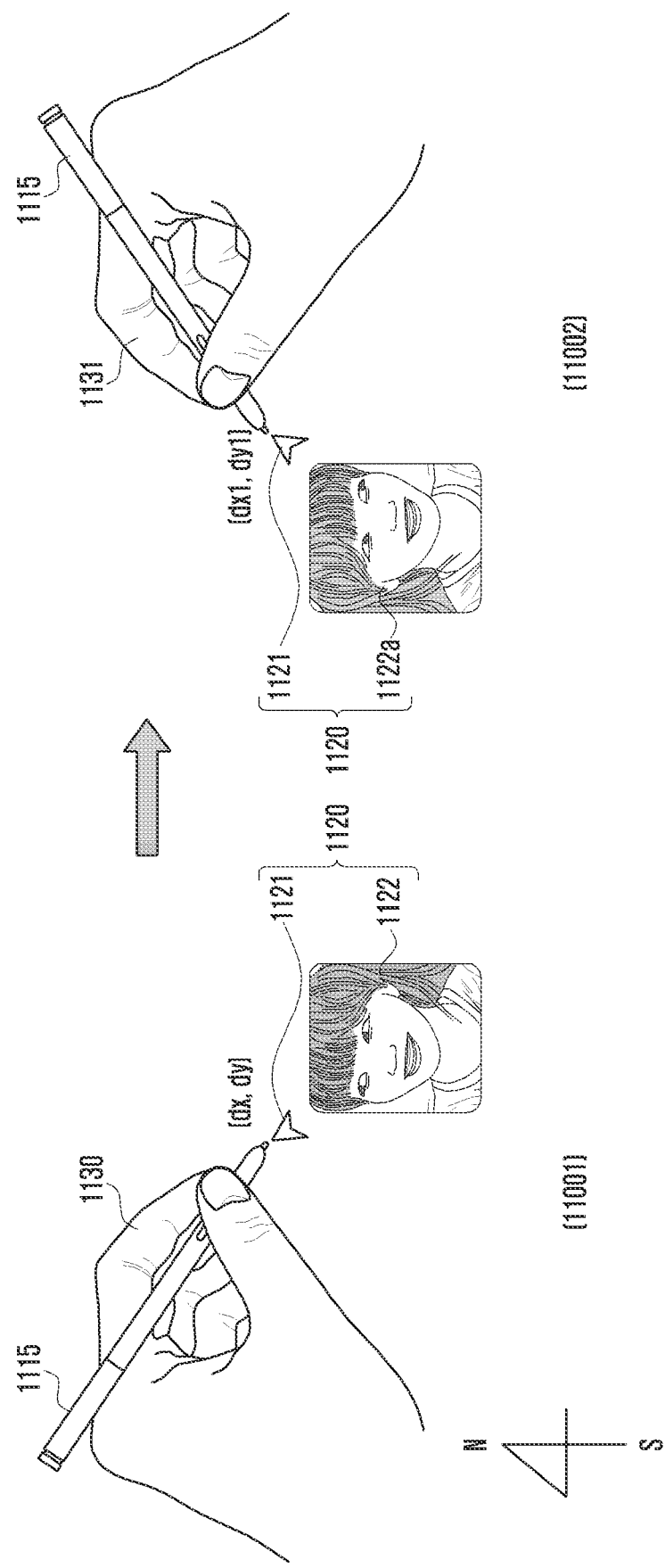
FIG. 11 illustrates an embodiment of displaying an electronic pen pointer of an electronic device according to an embodiment of the disclosure.

FIG. 11 illustrates an embodiment of displaying an electronic pen pointer of an electronic device according to an embodiment of the disclosure.

Referring to FIG. 11, an electronic device (e.g., the electronic device 101 in FIG. 1, 3, or 4) according to various embodiments may consider a holding direction of a hand 1130 holding an electronic pen 1115 to change the position of a direction indicator 1121, and change a characteristic of a custom object 1122 and display same. For example, as illustrated in view 11001, a user may hold the electronic pen 1115 (e.g., the electronic pen 201 in FIGS. 2 and 4) with a left hand 1130 to perform a hover input. The electronic device 101 may identify a holding direction of the left hand 1130, and automatically dispose an electronic pen pointer, for example, a transform pointer 1120. The electronic device 101 may consider a holding direction of the left hand 1130 to display the direction indicator 1121 to be oriented toward a first position (dx, dy) corresponding to the hover input, and display the custom object 1122 looking at the direction indicator 1121 (or the north-west direction (in eleven o'clock direction)).

On the contrary, in case where a user holds the electronic pen 1115 with a right hand 1131 to perform a hover input, as illustrated in view 11002, the electronic device 101 may display, with respect to the electronic pen 1115, the direction indicator 1121 (or the north-east direction (in one o'clock direction)) to be oriented toward a second position (dx1, dy1) corresponding to the hover input, and display a custom object 1122a looking at the direction indicator 1121.

According to some embodiments, the electronic device 101 may reflect the position of the direction indicator 1121 of an electronic pen pointer, for example, the transform pointer 1120 to change a characteristic of the custom object 1122 and display same. For example, in case that the direction indicator 1121 is oriented in the north-east direction, the electronic device 101 may also change the direction of the custom object 1122a to be oriented in the north-east direction, and display same.

The electronic device 101 according to various embodiments may support an electronic pen pointer to be automatically disposed at a position deviating from a region in which display on a display is restricted according to a structure change of the display. Hereinafter, examples of displaying an electronic pen pointer according to a structure change of a display of various electronic devices will be described.

Figure 12:
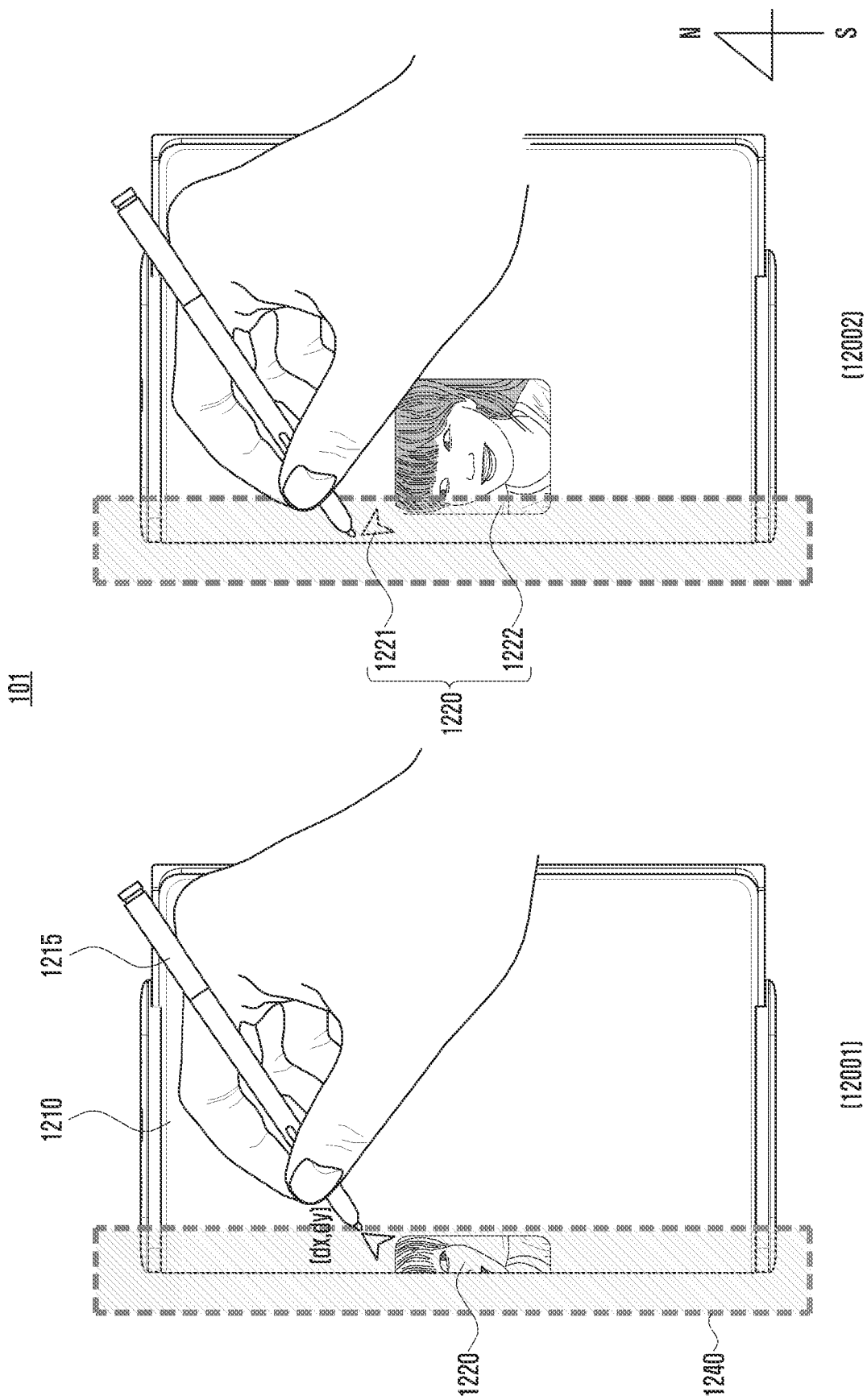
FIG. 12 illustrates an embodiment of displaying an electronic pen pointer according to a structure change of a display of an electronic device according to an embodiment of the disclosure.

FIG. 12 illustrates an embodiment of displaying an electronic pen pointer according to a structure change of a display of an electronic device according to an embodiment of the disclosure.

Referring to FIG. 12, according to an embodiment, an electronic device (e.g., the electronic device 101 in FIG. 1, 3, or 4) may be a slidable electronic device.

The slidable electronic device may indicate an electronic device in which a bending transform of a display 1210 is possible and thus at least a part thereof is able to be wound or rolled, or be received into a housing (not illustrated) of the electronic device 101. According to a user's need, the slidable electronic device may extend and use a screen display region by unfolding the display 1210 or exposing a wider area of the display 1210 to the outside. The slidable electronic device may include the display 1210, the display area of which is changeable.

As shown in view 12001, the electronic device 101 may be in a context in which a transform pointer 1220 is displayed in consideration of a hover input and a context of an electronic pen 1215 (e.g., the electronic pen 201 in FIGS. 2 and 4). A user may change an area of the display 1210 while performing a hovering input, and the electronic device 101 may identify a change in the area of the display 1210, and identify a boundary region 1240 in which a screen display region of the display 1210 is restricted.

The electronic device 101 may identify that the transform pointer 1220 displayed based on a hover point (dx, dy) is being displayed in the boundary region 1240. The electronic device 101 may, as illustrated in view 12002, change the positions of a direction indicator 1221 and a custom object 1222 of the transform pointer 1220 to a position deviating from the boundary region 1240 and display same.

Figure 13:
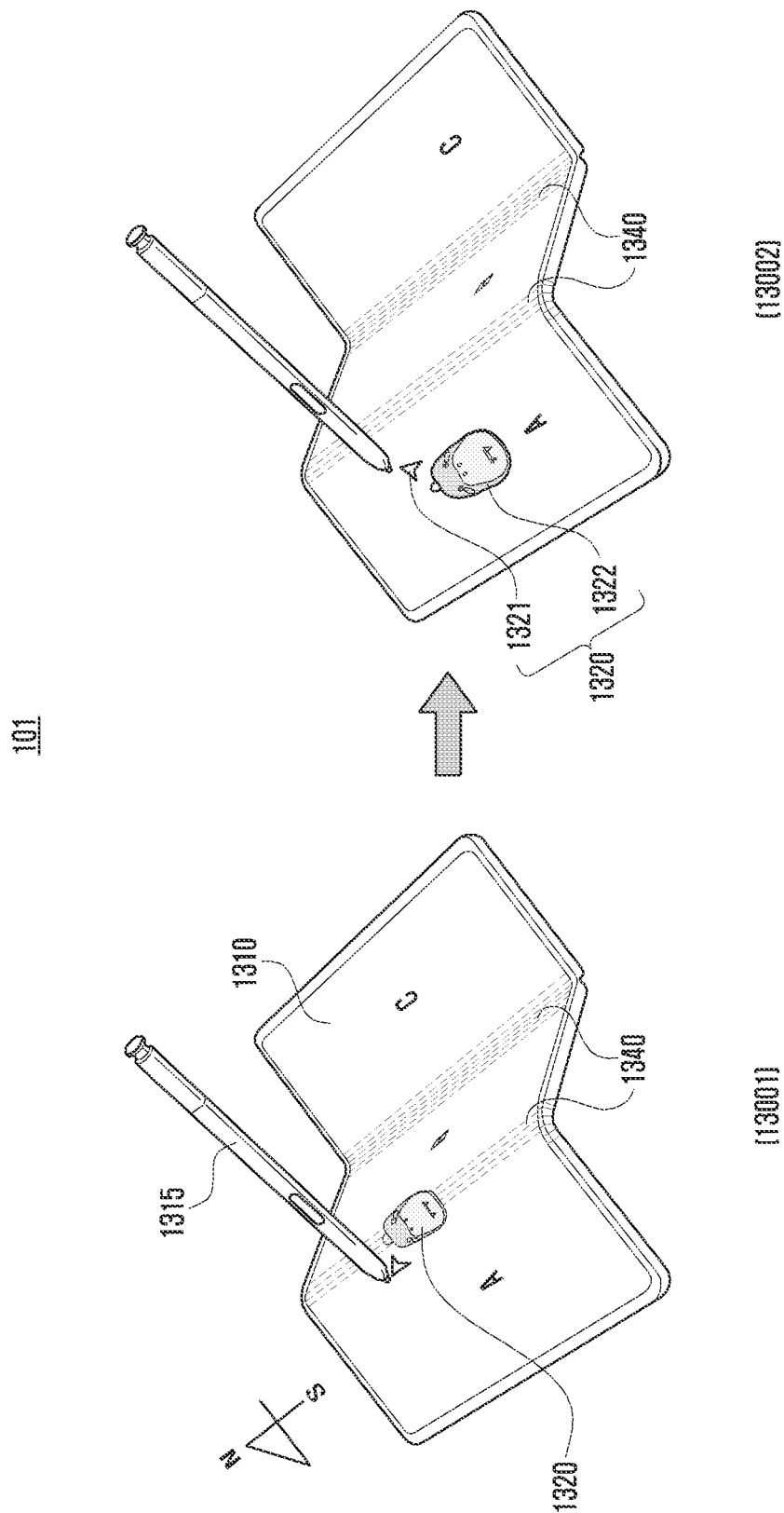
FIG. 13 illustrate embodiments of displaying an electronic pen pointer according to a structure change of a display of an electronic device according to an embodiment of the disclosure.
Figure 14:
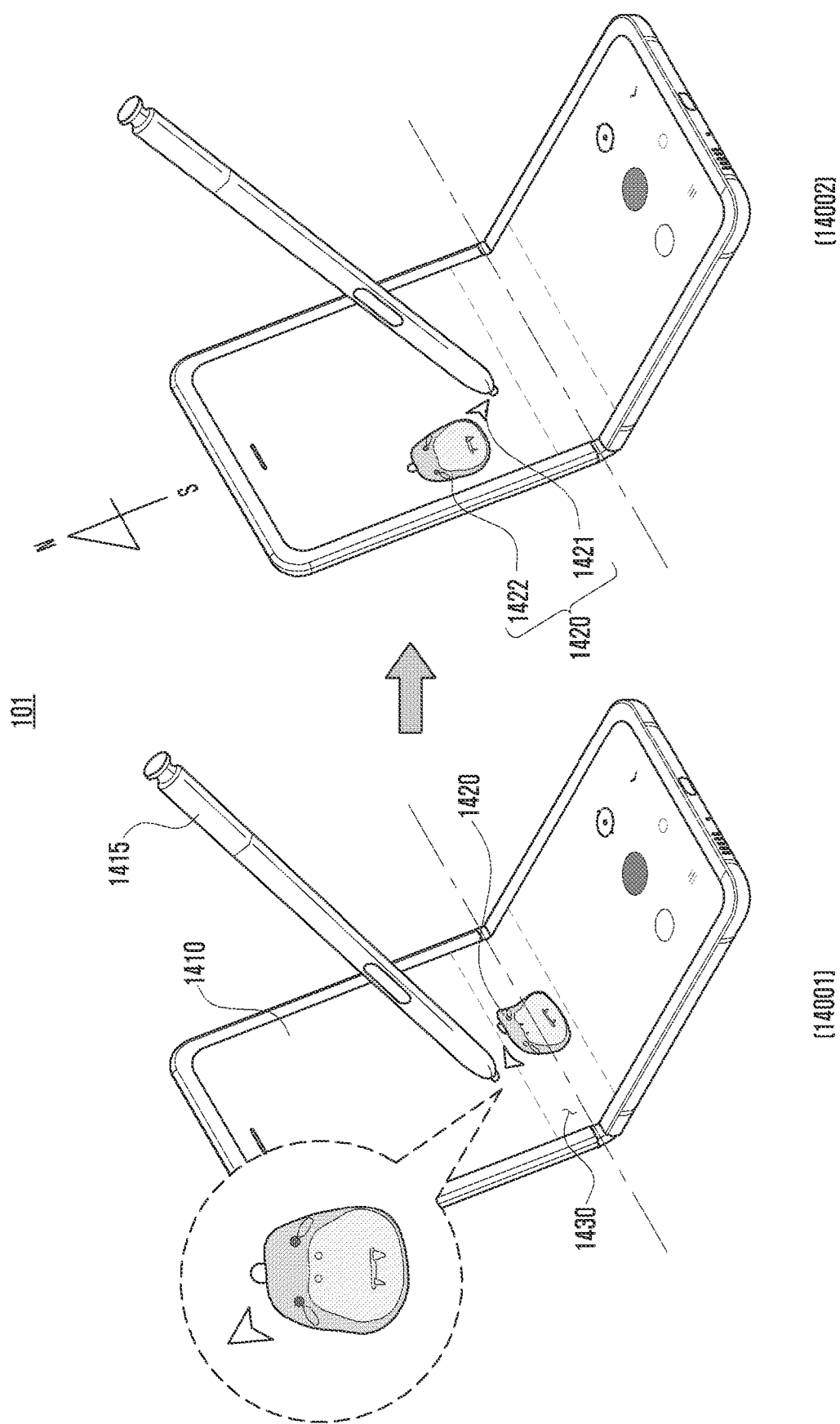
FIG. 14 illustrate embodiments of displaying an electronic pen pointer according to a structure change of a display of an electronic device according to an embodiment of the disclosure.

FIGS. 13 and 14 illustrate embodiments of displaying an electronic pen pointer according to a structure change of a display of an electronic device according to various embodiments of the disclosure.

Referring to FIGS. 13 and 14, according to various embodiments, an electronic device (e.g., the electronic device 101 in FIG. 1, 3, or 4) may be a foldable electronic device.

The foldable electronic device may indicate an electronic device in which at least two different regions of a display 1310 are foldable to face each other or face opposite directions. In a first state of the foldable electronic device, the display 1310 may be folded to allow at least two different regions to face each other or face opposite directions, and in a second state, at least two different regions of the display 1310 may be arranged to be substantially flat.

In the foldable electronic device, an activated region of a display 1310 or 1410 may be changeable according to a folding structure. The display 1310 of a foldable electronic device illustrated in FIG. 13 may include an A region, a B region, and a C region, and an activated display region of the display 1310 may be changeable according to a folding structure. The foldable electronic device illustrated in FIG. 14 may include an upper region and a lower region. The foldable electronic device is not limited to the electronic device illustrated in FIG. 13 and the electronic device illustrated in FIG. 14.

As shown in view 13001 and view 14001, the electronic device 101 may be in a context in which a transform pointer 1320 or 1420 is displayed in consideration of a hover input and a context of an electronic pen 1315 or 1415 (e.g., the electronic pen 201 in FIGS. 2 and 4). While a user is performing a hovering input, the electronic device 101 may identify that the transform pointer 1320 or 1420 is being displayed in a folding region (or joint region) 1340 or 1430 in which a display region of the display 1310 or 1410 is restricted. In case that the transform pointer 1320 or 1420 is displayed in the folding region (or joint region) 1340 or 1430, there may occur a problem in that the direction of a direction indicator 1321 and 1421 is ambiguous or the visibility of a custom object 1322 or 1422 degrades.

The electronic device 101 may, as illustrated in view 13002 and view 14002, change the positions of the direction indicator 1321 or 1421 and the custom object 1322 or 1422 of the transform pointer 1320 or 1420 to a position deviating from the folding region (or joint region) 1340 or 1430 and display same.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display; and
   a processor,
   wherein the processor is configured to perform control to:
      detect an input of an electronic pen,
      display an electronic pen pointer on the display in response to the input of the electronic pen,
      identify first information related to a visual feature of the electronic pen pointer,
      identify second information related to at least one of context information of the electronic pen or context information of the display,
      determine whether the electronic pen or a hand holding the electronic pen overlaps the electronic pen pointer based on the first information and the second information,
      when the electronic pen pointer is overlapped by the electronic pen or the hand holding the electronic pen, determine a direction and coordinates for change of a position of the electronic pen pointer so that there is no overlap with the electronic pen or the hand holding the electronic pen, and
      change the display of the electronic pen pointer to the determined direction and coordinates, and
   wherein the processor is further configured to:
      predict whether the electronic pen pointer is positioned in a region in which display is restricted in the display, based on the first information and the second information, and
      in case that a result of the prediction indicates the electronic pen pointer being positioned in the region in which display is restricted in the display, determine, as the direction and coordinates, a position deviating from the region in which display is restricted in the display.

2. The electronic device of claim 1,
   wherein the electronic pen pointer is a graphic object generated through an electronic pen theme allowing change of at least one of a size, a shape, a type, or a color of the electronic pen pointer,
   wherein the graphic object comprises at least one of a direction indicator or a custom object,
   wherein the direction indicator comprises an object showing hover position information of the electronic pen or indicating a hover input position, and
   wherein the custom object comprises at least one of an icon, an image, a two-dimensional object, an emoji, a three-dimensional object, a character, a sticker, an avatar, or an emoticon.

3. The electronic device of claim 2, wherein the processor is further configured to identify the first information through at least one of a region in which the electronic pen pointer is displayed on the display and position information of the region, direction information or azimuth information of the direction indicator or the custom object, feature information of the custom object, or relative position information between the direction indicator and the custom object.

4. The electronic device of claim 1, further comprising a communication circuit,
   wherein the processor is further configured to:
      receive electronic pen information from the electronic pen via the communication circuit, and
      identify the second information through one of coordinate information of the electronic pen, inclination information of the electronic pen, inclination direction information of the electronic pen, or holding direction information of a hand holding the electronic pen, which are identified through the received electronic pen information.

5. The electronic device of claim 1, further comprising a sensor circuit,
   wherein the processor is further configured to:
      receive context information of the display via the sensor circuit, and
      identify the second information through one of structure change information of the display, a structure change of the electronic device, active region information of the display, boundary region or joint region information of the display, or information on a multi-window region displayed on the display, which are identified through the received context information of the display.

6. The electronic device of claim 1, wherein the processor is further configured to:
   predict whether the electronic pen or a hand holding the electronic pen overlaps the electronic pen pointer, based on the first information and the second information,
   predict whether the electronic pen pointer is positioned in a region in which display is restricted in the display, and determine, as the direction and coordinates, a position at which there is no overlap with the electronic pen or the hand holding the electronic pen, and a position deviating from the region in which display is restricted in the display.

7. A method for displaying an electronic pen pointer of an electronic device, the method comprising:
receiving an input of an electronic pen;
displaying an electronic pen pointer on a display in response to the input of the electronic pen;
identifying first information related to a visual feature of the electronic pen pointer;
identifying second information related to at least one of context information of the electronic pen and context information of the display;
determining whether the electronic pen or a hand holding the electronic pen overlaps the electronic pen pointer based on the first information and the second information;
when the electronic pen pointer is overlapped by the electronic pen or the hand holding the electronic pen, determine a direction and coordinates for change of a position of the electronic pen pointer so that there is no overlap with the electronic pen or the hand holding the electronic pen; and
changing the displaying of the electronic pen pointer to the determined direction and coordinates,
wherein the determining of the direction and coordinates for change of the position of the electronic pen pointer comprises:
predicting whether the electronic pen pointer is positioned in a region in which display is restricted in the display, based on the first information and the second information; and
in case that a result of the prediction indicates the electronic pen pointer being positioned in the region in which display is restricted in the display, determining, as the direction and coordinates, a position deviating from the region in which display is restricted in the display, and wherein the region in which display is restricted in the display comprises:
a boundary region,
an overlapped region, and
a multi-window region other than a multi-window region in which the electronic pen pointer is activated, according to a folding structure of the display.

8. The method of claim 7,
wherein the electronic pen pointer is a graphic object generated through an electronic pen theme allowing change of at least one of a size, a shape, a type, or a color of the electronic pen pointer,
wherein the graphic object comprises at least one of a direction indicator or a custom object, and
wherein the displaying of the electronic pen pointer on the display comprises displaying at least one of a direction indicator and a custom object configured through the electronic pen theme at a position and in a direction configured by default.

9. The method of claim 8,
wherein the identifying of the first information comprises identifying at least one of a region in which the electronic pen pointer is displayed on the display, and position information of a displayed region, direction information or azimuth information of the direction indicator or the custom object, feature information of the custom object, or relative position information between the direction indicator and the custom object, and
wherein the identifying of the second information comprises:
receiving electronic pen information from the electronic pen via a communication circuit; and
identifying coordinate information of the electronic pen, inclination information of the electronic pen, and inclination direction information of the electronic pen, based the received electronic pen information, to determine a holding direction of a hand to hold the electronic pen.

10. The method of claim 7, wherein the identifying of the second information further comprises:
receiving context information of the display via a sensor circuit;
identify a structure change of the display or a structure change of the electronic device, active region information of the display, boundary region information or joint region information of the display, and information on a multi-window region displayed on the display, based on the context information of the display;
identifying the second information through one of the structure change of the display or the structure change of the electronic device, the active region information of the display, the boundary region information or the joint region information of the display, or the information on a multi-window region displayed on the display; or
identifying a region in which the electronic pen pointer is displayed among the multi-window region.

11. The method of claim 7,
wherein the determining of the direction and coordinates for change of the position of the electronic pen pointer further comprises:
predicting whether the electronic pen or a hand holding the electronic pen overlaps the electronic pen pointer, based on the first information and the second information; and
predicting whether the electronic pen pointer is positioned in a region in which display is restricted in the display, and
wherein a position at which there is no overlap with the electronic pen or the hand holding the electronic pen, and a position deviating from the region in which display is restricted in the display are determined as the direction and coordinates.

* * * * *